United States Patent
Takada

(10) Patent No.: US 11,391,187 B2
(45) Date of Patent: Jul. 19, 2022

(54) CONTROL VALVE USED IN VALVE TIMING CONTROL DEVICE FOR INTERNAL COMBUSTION ENGINE AND VALVE TIMING CONTROL SYSTEM FOR INTERNAL COMBUSTION ENGINE

(71) Applicant: HITACHI ASTEMO, LTD., Hitachinaka (JP)

(72) Inventor: Yasuhide Takada, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/424,318

(22) PCT Filed: Nov. 21, 2019

(86) PCT No.: PCT/JP2019/045529
§ 371 (c)(1),
(2) Date: Jul. 20, 2021

(87) PCT Pub. No.: WO2020/152965
PCT Pub. Date: Jul. 30, 2020

(65) Prior Publication Data
US 2022/0074323 A1 Mar. 10, 2022

(30) Foreign Application Priority Data
Jan. 21, 2019 (JP) .............................. JP2019-007453

(51) Int. Cl.
*F01L 1/34* (2006.01)
*F01L 1/344* (2006.01)
*F16K 11/07* (2006.01)

(52) U.S. Cl.
CPC ........ *F01L 1/3442* (2013.01); *F16K 11/0716* (2013.01); *F01L 2001/34426* (2013.01)

(58) Field of Classification Search
CPC .................... F01L 1/3442; F01L 1/356; F01L 2001/34426; F16K 11/0716; F16K 3/26
See application file for complete search history.

(56) References Cited

U.S. PATENT DOCUMENTS

2017/0022854 A1* 1/2017 Takada .................... F01L 1/047

FOREIGN PATENT DOCUMENTS

JP 2018-048557 A 3/2018

OTHER PUBLICATIONS

International Preliminary Report on Patentability dated Jul. 29, 2021 issued in International Application No. PCT/JP2019/045529, with English translation, 11 pages.

(Continued)

*Primary Examiner* — Zelalem Eshete
(74) *Attorney, Agent, or Firm* — Foley & Lardner LLP

(57) ABSTRACT

In a first state: a spool valve of a control valve is disposed such that a second spool oil passage is closer to a second side in a longitudinal direction than a first spool oil passage; and as the spool valve has traveled toward the second side against a biasing force of a biasing member, a first port communicates with a second port via the first spool oil passage, a first sleeve oil passage, and the second spool oil passage. In a second state: the spool valve is disposed such that the first spool oil passage is closer to the second side than the second spool oil passage; and as the spool valve has traveled toward a first side in the longitudinal direction, the first port communicates with the second port via the first spool oil passage, the first sleeve oil passage, and the second spool oil passage.

19 Claims, 16 Drawing Sheets

(56) References Cited

OTHER PUBLICATIONS

International Search Report dated Feb. 10, 2020 issued in International Application No. PCT/JP2019/045529, with English translation, 5 pages.

* cited by examiner

CONTROL VALVE USED IN VALVE TIMING CONTROL DEVICE FOR INTERNAL COMBUSTION ENGINE AND VALVE TIMING CONTROL SYSTEM FOR INTERNAL COMBUSTION ENGINE

TECHNICAL FIELD

The present invention relates to a control valve for an internal combustion engine valve timing control device, and an internal combustion engine valve timing control system.

BACKGROUND ART

Conventionally, a patent document 1 discloses a control valve for an internal combustion engine valve timing control device.

The control valve disclosed in patent document 1 includes a spool valve slidably mounted inside a tubular valve body. The spool valve has: a first position where a retard port communicates with a supply port, and an advance port communicates with a drain port; a second position where the retard port and the advance port are closed, and communication of the retard port and the advance port with the supply port is cut off; a third position where the advance port communicates with the supply port, and the retard port communicates with a drain passage; and a fourth position where the advance port communicates with the supply port, communication between the retard port and the drain port is cut off, and a check valve is opened to cause the retard port to communicate with the advance port via a connection passage.

With the fourth position, it is possible to achieve a quick response mode in which a control response in a direction to one side is enhanced only as required, while ensuring a suitable control response during normal phase conversion.

The fourth position is a position where an actuator causes the spool valve to travel maximally toward the other side in a longitudinal direction against a biasing force of a biasing member.

PRIOR ART DOCUMENT(S)

Patent Document(s)

patent document 1: JP 2018-48557 A

SUMMARY OF INVENTION

Problem(s) to be Solved by the Invention

For example, the control valve described above is applied to an intake camshaft to form a valve timing advance control device mainly for conversion from a default phase to an advance side, and is applied to an exhaust camshaft to form a valve timing retard control device mainly for conversion from a default phase to a retard side. There is a demand for cost reduction by commonality of various components therebetween.

Furthermore, for achieving a quick response mode like the fourth position of the control valve according to patent document 1, the retard port and the advance port may be arranged in different positions in the longitudinal direction of the valve body between the valve timing advance control device and the valve timing retard control device, and accordingly, switching timings of the control valve may be different between the valve timing advance control device and the valve timing retard control device.

However, this may cause a cost increase because it is required to configure the control valve differently for the two valve timing control devices having different switching timings, especially in terms of structure of the valve body, where commonality of components is impossible.

The present invention has been devised in view of conventional circumstances. It is an object of the present invention to provide a control valve for an internal combustion engine valve timing control device or the like, with which cost reduction can be achieved by commonality of various components between two valve timing control devices having different switching timings.

Means for Solving the Problem(s)

According to a preferable embodiment, a spool valve has a first state wherein: the spool valve is disposed such that a second spool oil passage is closer to a second side opposite to a first side in a longitudinal direction than a first spool oil passage; and as the spool valve has traveled toward the second side in the longitudinal direction against a biasing force of a biasing member, a first port communicates with a second port via the first spool oil passage, a first sleeve oil passage, and the second spool oil passage. Furthermore, the spool valve has a second state wherein: the spool valve is disposed such that the first spool oil passage is closer to the second side in the longitudinal direction than the second spool oil passage; and as the spool valve has traveled toward the first side in the longitudinal direction, the first port communicates with the second port via the first spool oil passage, the first sleeve oil passage, and the second spool oil passage. The first state and the second state can be assembled by adjustment of orientation of the spool valve and others.

Effect(s) of the Invention

According to the preferable embodiment of the present invention, it is possible to achieve commonality of various components between two valve timing control devices having different directions for which control responsiveness is enhanced, and thereby achieve cost reduction.

MODE(S) FOR CARRYING OUT INVENTION

The following describes a control valve for an internal combustion engine valve timing control device and an internal combustion engine valve timing control system according to embodiments of the present invention with reference to the drawings.

The valve timing control device is implemented by commonality of components for both of a control device mainly for conversion from a default position to an advance side by application to a camshaft 2 on an intake side and a control device mainly for conversion from a default position to a retard side by application to a camshaft 2 on an exhaust side. Namely, by use of common components, the valve timing control device can be converted between a first state described below applied to the camshaft 2 on the intake side and a second state described below applied to the camshaft 2 on the exhaust side.

Figure 1:
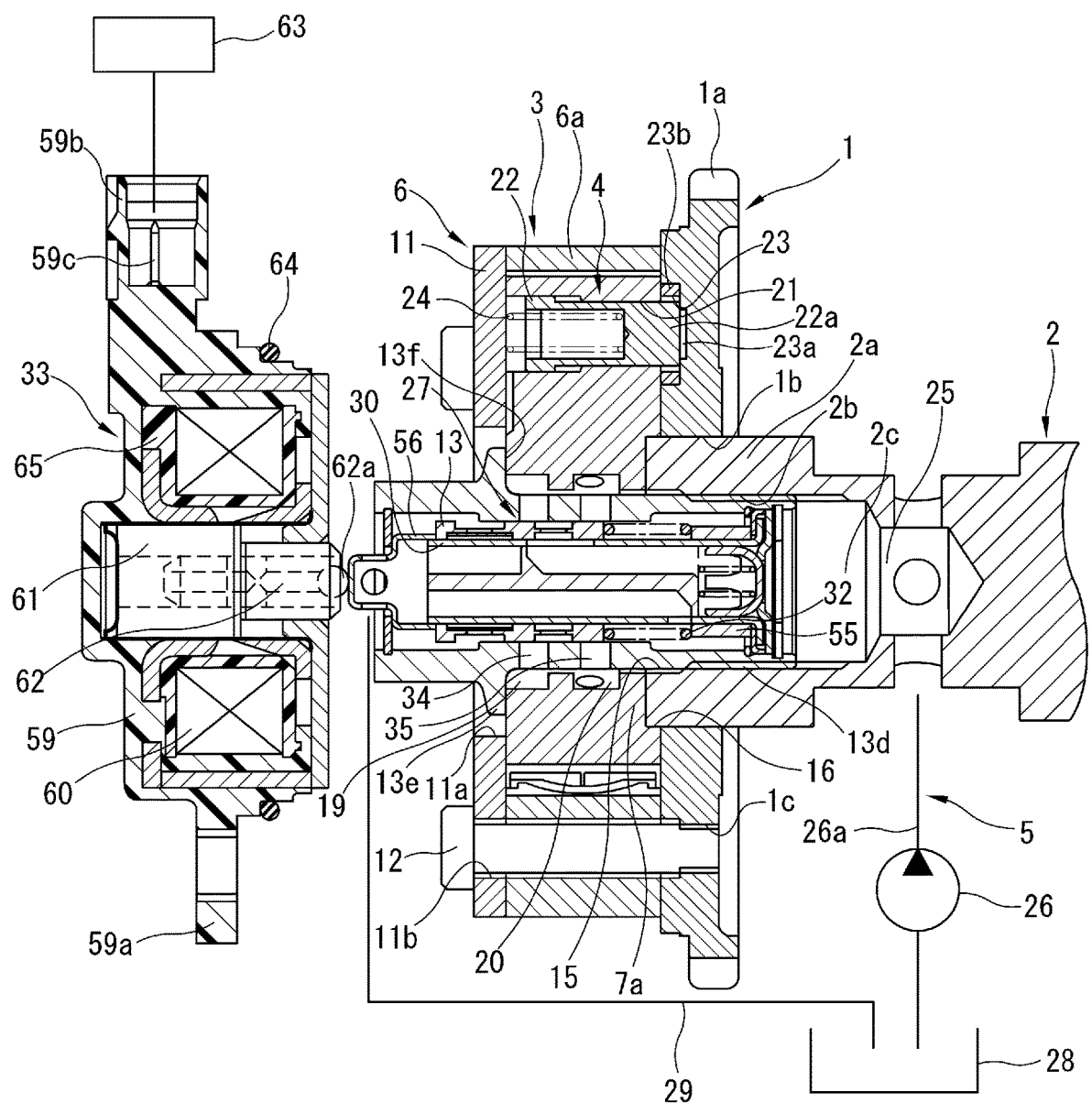
FIG. 1 is a sectional view of a valve timing control device according to an embodiment, which is applied to an intake valve side of an internal combustion engine.
Figure 2:
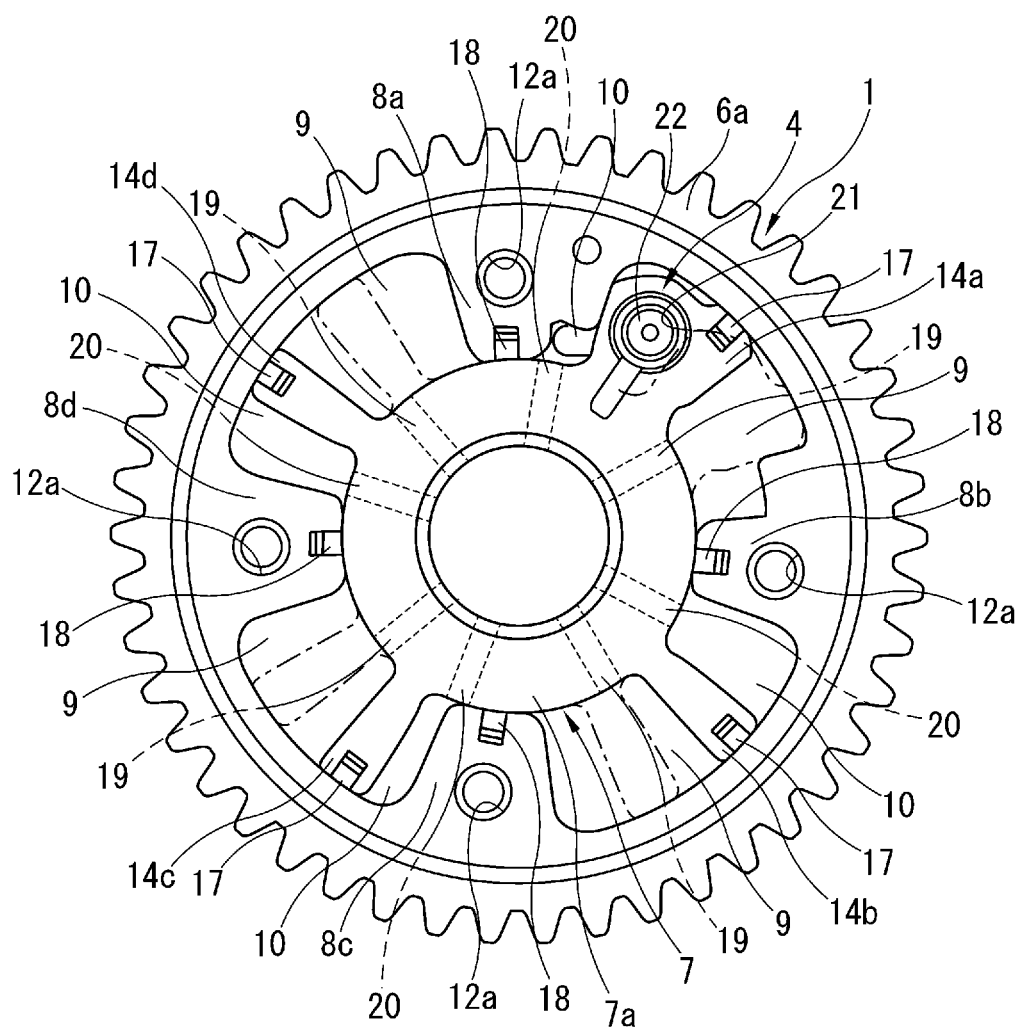
FIG. 2 is a front view of the valve timing control device according to the present embodiment when a front cover is removed.
Figure 3:
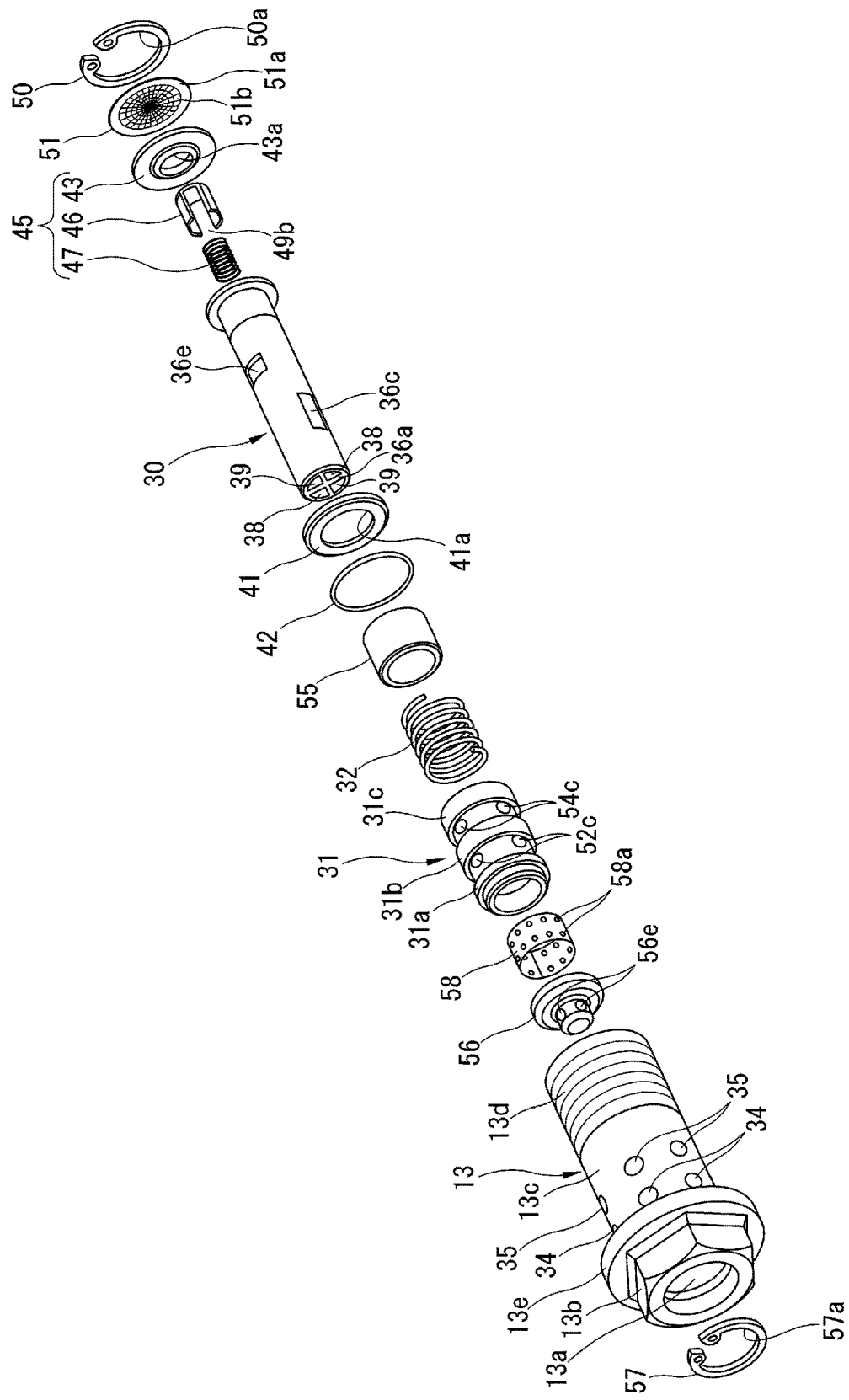
FIG. 3 is an exploded perspective view of a control valve according to the present embodiment.
Figure 4:
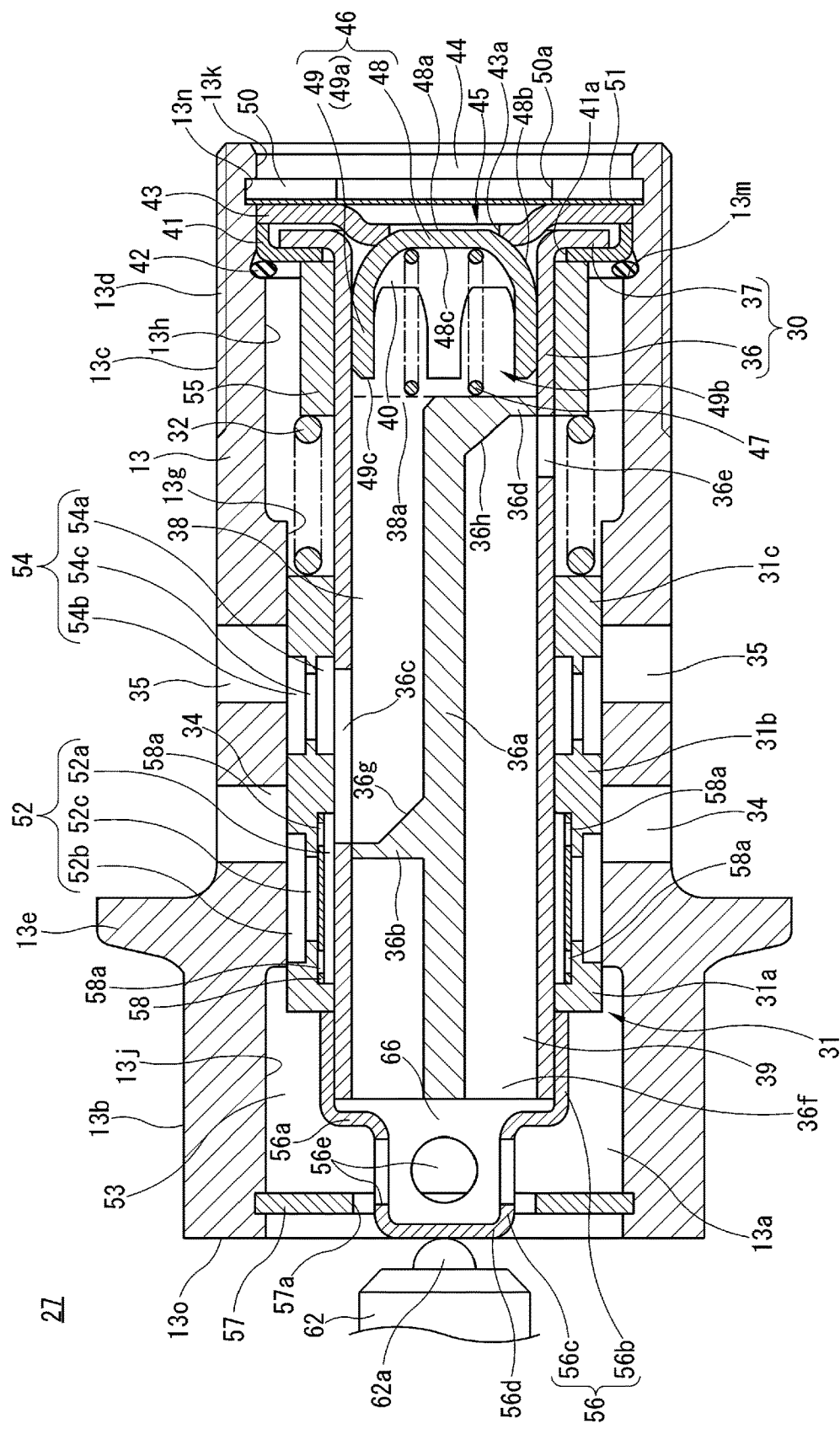
FIG. 4 is a longitudinal sectional view of the control valve according to the present embodiment when in a first state.
Figure 5:
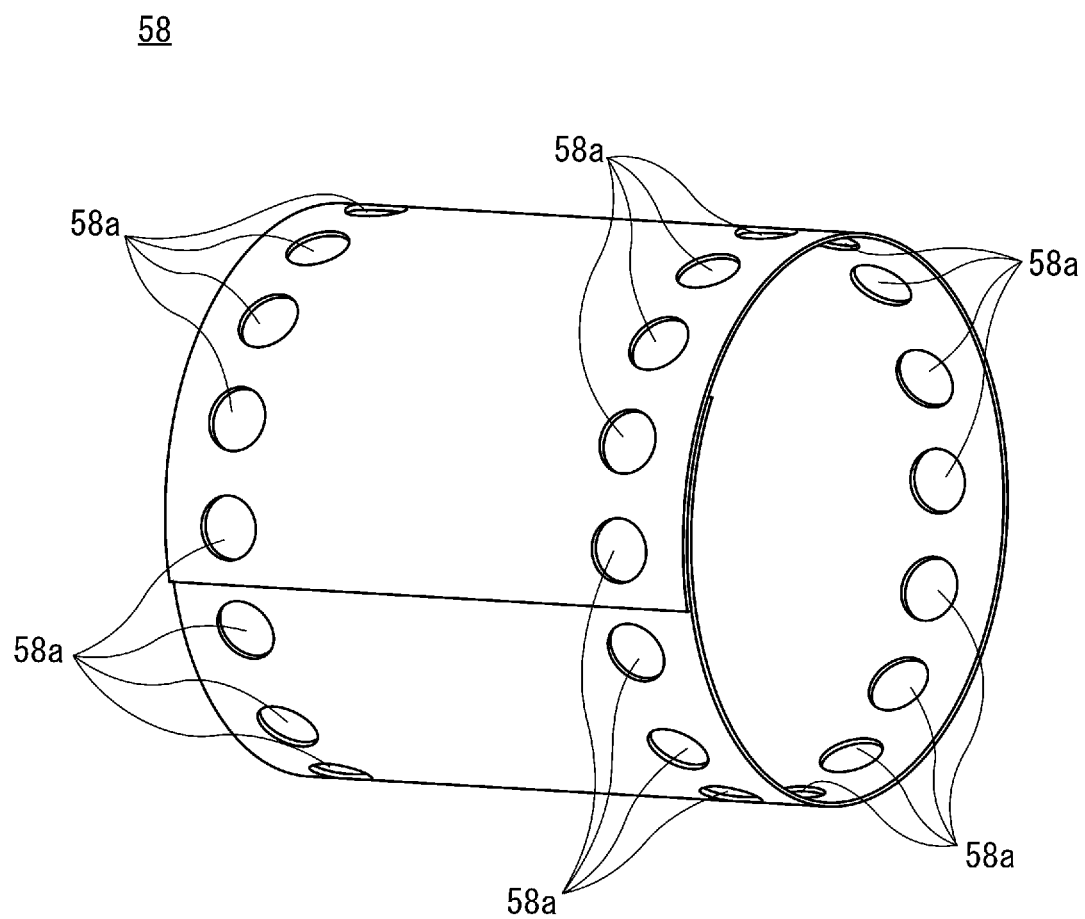
FIG. 5 is a perspective view of a second check valve according to the present embodiment.

<Configuration of Valve Timing Control Device According to Present Embodiment Applied to Intake Valve Side>
FIG. 1 is a sectional view of a valve timing control device (valve timing control system) according to an embodiment, which is applied to an intake valve side of an internal combustion engine. FIG. 2 is a front view of the valve timing control device according to the present embodiment, which is applied to the intake valve side of the internal combustion engine, when a front cover 11 is removed. FIG. 3 is an exploded perspective view of a control valve 27 according to the present embodiment which is applied to the intake valve side of the internal combustion engine. FIG. 4 is a longitudinal sectional view of the control valve 27 according to the present embodiment, which is applied to the intake valve side of the internal combustion engine, when in a first state. FIG. 5 is a perspective view of a second check valve 58 according to the present embodiment.

As shown in FIGS. 1 and 2, the valve timing control device includes: a timing sprocket 1 as a driving rotor structured to be rotationally driven by a crankshaft of the engine via a timing chain not shown; an intake camshaft 2 arranged to be relatively rotatable with respect to the timing sprocket 1; a phase-varying mechanism 3 structured to convert a relative rotation phase between the timing sprocket 1 and the camshaft 2; a lock mechanism 4 structured to lock the phase-varying mechanism 3 in a most retarded phase position; and a hydraulic circuit 5 structured to operate the phase-varying mechanism 3 and the lock mechanism 4. The driving rotor may be a timing pulley to which a torque is transmitted by a timing belt.

The timing sprocket 1 is formed in a disc shape, and includes: a gear part 1a, wherein the timing chain is wound around an outer periphery of the gear part 1a; and a bearing hole 1b formed through a central portion of the timing sprocket 1, wherein the timing sprocket 1 is rotatably supported by an outer periphery of a first end part 2a of the camshaft 2 via the bearing hole 1b. The timing sprocket 1 further includes an outer peripheral part formed with a plurality of internal thread holes 1c at corresponding positions (four in the present embodiment) arranged and evenly spaced in a circumferential direction of the timing sprocket 1.

The timing sprocket 1 is configured also as a rear cover to liquid-tightly close a rear end opening of a housing described below.

The camshaft 2 is rotatably supported on a cylinder head not shown via a plurality of cam bearings, and includes an outer peripheral face to which a plurality of oval rotary cams for opening intake valves not shown as engine valves are fixed integrally. The camshaft 2 further includes the first end part 2a in a rotation axis direction of the camshaft 2, wherein an internal thread hole 2b is formed in the first end part 2a to extend inside along a longitudinal axis of the camshaft 2, and wherein a valve body (cam bolt) 13 described below is screwed in the internal thread hole 2b.

As shown in FIGS. 1 and 2, the phase-varying mechanism 3 includes: a housing 6 provided integrally with the timing sprocket 1 and extending in the axial direction from the timing sprocket 1; and a vane rotor 7 as a driven rotor mounted inside the housing 6 and structured to rotate with respect to the housing 6. The vane rotor 7 and four shoes 8a to 8d integrally formed in an inner peripheral face of a housing body 6a described below of the housing 6 divide a space between the vane rotor 7 and the housing body 6a into a plurality of retard hydraulic chambers 9 as retarding operation chambers (four in the present embodiment) and a plurality of advance hydraulic chambers 10 as advancing operation chambers (four in the present embodiment).

The housing 6 includes: the housing body 6a cylindrically shaped; the front cover 11 closing a front end opening of the housing body 6a; and the timing sprocket 1 closing the rear end opening of the housing body 6a.

The housing body 6a is formed in a substantially cylindrical shape of a so-called sintered metal material by sintering metal powder. The four shoes 8a to 8d are formed to project from the inner peripheral face of the housing body 6a, and are formed with four bolt insertion holes 12a respectively, wherein the bolt insertion holes 12a extend inside through the corresponding shoes 8a to 8d in the axial direction.

The front cover 11 is formed by press molding to be smaller in wall thickness than the timing sprocket 1, and includes a central portion formed with an insertion hole 11a having a large diameter. Furthermore, an inner lateral face of the front cover 11 except the insertion hole 11a and a lateral face of the vane rotor 7 facing the front cover 11 serve to seal the inside of each retard hydraulic chamber 9 and the inside of each advance hydraulic chamber 10 therebetween. Furthermore, the front cover 11 includes an outer peripheral part formed with four bolt insertion holes 11b extending through at positions arranged in the circumferential direction, wherein a fixing member such as a bolt 12 is inserted in each bolt insertion hole 11b.

The timing sprocket 1, the housing body 6a, and the front cover 11 are coupled together in the axial direction by the four bolts 12 that are inserted in the respective bolt insertion holes 11b and screwed in the respective internal thread holes 1c of the timing sprocket 1.

The vane rotor 7 is integrally formed of a sintered metal material similarly, and includes: a rotor part 7a fixed to the first end part 2a of the camshaft 2 by the valve body 13; and four vanes 14a to 14d formed in the outer peripheral face of the rotor part 7a to project radially, and substantially evenly spaced at intervals of approximately 90° in the circumferential direction.

The rotor part 7a is formed in a cylindrical shape having a relatively large diameter, and includes a central portion formed with a bolt insertion hole 15 that extends through in the axial direction and is continuous with the internal thread hole 2b of the camshaft 2. The tip of the first end part 2a of the camshaft 2 is fitted in the rotation axis direction into a circular fitting recess 16 formed in a rear end face of the rotor part 7a.

Each vane 14a to 14d is formed to have a relatively small size of projection in the radial direction, and is arranged between the corresponding shoes 8a to 8d. Furthermore, the three vanes 14b to 14d other than the vane 14a are each formed in a relatively thin plate shape with substantially the same width in the circumferential direction. The vane 14a is formed to have a larger width in the circumferential direction, wherein a part of the lock mechanism 4 is provided inside the vane 14a.

The outer peripheral faces of the vanes 14a to 14d and the tips of the shoes 8a to 8d are provided with sealing members 17 and 18 respectively, for sealing between the inner peripheral face of the housing body 6a and the outer peripheral face of the rotor part 7a.

As shown in FIG. 2, when the vane rotor 7 relatively rotates to the retard side, a side face of the vane 14a abuts on a side face of the shoe 8a facing the vane 14a, thereby restricting rotation of the vane rotor 7 at a most retarded position. On the other hand, as shown by alternate long and short dash lines in FIG. 2, when the vane rotor 7 relatively rotates to the advance side, the other end face of the vane 14a abuts on a side face of the other shoe 8b facing the vane 14a, thereby restricting rotation of the vane rotor 7 at a most advanced position.

On the other hand, the other vanes 14b to 14d are not in contact with but apart from the opposite faces of the shoes 8c, 8d, 8a facing the vanes in the circumferential direction. This serves to enhance the precision of contact between the vane rotor 7 and the shoe 8a, and enhance the speed of supplying hydraulic pressure to the retard hydraulic chambers 9 and the advance hydraulic chambers 10, thereby enhancing the responsiveness of normal and reverse rotation of the vane rotor 7.

The four retard hydraulic chambers 9 and the four advance hydraulic chambers 10 described above are respectively formed between the side faces of the vanes 14a to 14d facing in the forward and reverse rotational directions and the side faces of the shoes 8a to 8d. The retard hydraulic chambers 9 and the advance hydraulic chambers 10 communicate with four retard passage holes 19 and advance passage holes 20 respectively, which are each formed to extend inwardly in a radial direction from the inner peripheral face of the rotor part 7a. Each of the retard passage holes 19 and the advance passage holes 20 communicates with the hydraulic circuit 5 via the control valve 27 described below.

The lock mechanism 4 is structured to hold the vane rotor 7 in the most retarded rotational position (shown in FIG. 2) as a default position with respect to the housing 6.

As shown in FIGS. 1 and 2, the lock mechanism 4 includes: a lock pin 22 arranged to travel forward and backward with respect to the timing sprocket 1; a lock hole 23 structured to lock the vane rotor 7 by insertion of a tip portion 22a of the lock pin 22 in the lock hole 23; and an insertion and release mechanism structured to cause the tip portion 22a of the lock pin 22 to be inserted into the lock hole 23 and cancel the insertion, depending on a state of start of the engine.

The lock pin 22 is slidably mounted in a slide hole 21 that is formed in the vane 14a to extend through the vane 14a in the axial direction. The whole of the lock pin 22 including the tip portion 22a is formed in a substantially cylindrical shape suitable to be inserted into the lock hole 23 in the axial direction. The lock pin 22 is provided with a coil spring 24 mounted in compressed state between the inner end face of the front cover 11 and a bottom face of a recess formed in the lock pin 22 to extend in the axial direction from a rear end side of the lock pin 22, wherein the coil spring 24 biases the lock pin 22 in a direction to travel forward (in a direction of insertion). When no hydraulic pressure is supplied to a pressure receiving chamber 23a in the lock hole 23, the tip portion 22a of the lock pin 22 is inserted in the lock hole 23 by a spring force of the coil spring 24, thereby restricting relative rotation of the vane rotor 7 with respect to the housing 6.

The lock hole 23 is formed at a predetermined substantially central position in a radial direction of the timing sprocket 1. The lock hole 23 with an annular sleeve 23b is formed in a circular shape having a diameter sufficiently larger than an outer diameter of the tip portion 22a of the lock pin 22, and is positioned in the inner face of the timing sprocket 1 to correspond in position to the most retarded position of the vane rotor 7.

The insertion and release mechanism includes: the coil spring 24 structured to bias the lock pin 22 in the forward direction; and a release hydraulic circuit not shown structured to cause the lock pin 22 to travel backward by supply of hydraulic pressure to the pressure receiving chamber 23a in the lock hole 23. The release hydraulic circuit is configured such that hydraulic pressures selectively supplied to the retard hydraulic chambers 9 and the advance hydraulic chamber 10s are supplied to the pressure receiving chamber 23a via a predetermined oil hole and act on the lock pin 22 in the backward direction.

As shown in FIG. 1, the hydraulic circuit 5 includes: a supply part 25; an oil pump 26 structured to discharge hydraulic pressure to the supply part 25 via a discharge passage 26a; the control valve (hydraulic control valve) 27 structured to switch flow paths of the retard passage holes 19 and the advance passage holes 20 with respect to the supply part 25, depending on an engine operating state; and a drain passage 29 structured to drain working oil from the hydraulic chambers 9, 10 to an oil pan 28 via the hydraulic control valve 27.

The supply part 25 is formed in the camshaft 2 to extend through a bearing part of the camshaft 2 and extend in the axial direction of the camshaft 2. The supply part 25 has a downstream end communicating with the discharge passage 26a of the oil pump 26. The supply part 25 has an upstream end communicating with the bottom part 2c of the internal thread hole 2b of the camshaft 2 and facing via the bottom 2c a supply passage 44 described below formed in the valve body 13.

The oil pump 26 is implemented by a vane type or a trochoid type, for example.

The control valve 27 is provided in the rotor part 7a to extend in the axial direction of the rotor part 7a. As shown in FIGS. 3 and 4, the control valve 27 generally includes: the valve body 13 cylindrically shaped; a cylindrical sleeve 30 arranged inside the valve body 13; a cylindrical spool valve 31 arranged between the sleeve 30 and the valve body 13; a helical compression spring 32 structured to bias the spool valve 31 leftward in FIGS. 3 and 4; an electromagnetic actuator 33 structured to press the spool valve 31 against the biasing force of the helical compression spring 32.

For convenience of the following description, a term "longitudinal direction" is defined as the longitudinal direction of the cylindrical valve body 13, a term "radial direction" is defined as a direction orthogonal to the longitudinal direction, and a term "circumferential direction" is defined as a direction around the longitudinal direction. Furthermore, of both ends of the valve body 13 in the longitudinal direction, an end of the valve body 13 where a second stopper member 57 is arranged is referred to as "first side in the longitudinal direction", and an end of the valve body 13 where a first stopper member 50 is arranged is referred to as "second side in the longitudinal direction".

The valve body 13 is made of an iron-based metal material, and functions as a cam bolt to fix the vane rotor 7 to the first end part 2a of the camshaft 2 in the longitudinal direction. The valve body 13 has a hollow cylindrical shape having a valve hole 13a extending through the valve body 13 in the longitudinal direction. The valve body 13 includes: a head part 13b having a hexagonal outer periphery; a shank part 13c inserted in the bolt insertion hole 15 of the rotor part 7a of the vane rotor 7; and an external thread portion 13d formed in an outer periphery of a tip portion of the shank part 13c, and screwed in the internal thread hole 2b of the camshaft 2.

As the valve body 13 is fastened to the camshaft 2, a flange part 13e of the valve body 13 at a root side of the head part 13b is located in the insertion hole 11a of the front cover 11, and a seating face 13f of the flange part 13e is seated on a peripheral face of the rotor part 7a surrounding the bolt insertion hole 15 (see FIG. 1).

As shown in FIGS. 3 and 4, the shank part 13c includes four retard ports 34 as first ports formed in a portion of a peripheral wall adjacent to the head part 13b, wherein the four retard ports 34 are evenly spaced at intervals of 90° in the circumferential direction, and extend through the peripheral wall. Furthermore, the shank part 13c includes four advance ports 35 as second ports formed in a portion of the peripheral wall closer to the external thread portion 13d than the retard ports 34, wherein the four advance ports 35 are evenly spaced at intervals of 90° in the circumferential direction, and extend through the peripheral wall.

In an inner peripheral face of the head part 13b adjacent to the flange part 13e and in an inner peripheral face of the shank part 13c continuous with the inner peripheral face of the head part 13b, a slide portion 13g is formed on which first to third land parts 31a, 31b, 31c described below of the spool valve 31 can slide.

Furthermore, in a portion of the inner peripheral face of the shank part 13c adjacent to the slide portion 13g and closer to the second side in the longitudinal direction than the slide portion 13g, a first non-slide portion 13h is formed to be larger in inner diameter than the slide portion 13g, and is out of sliding contact with the first to third land parts 31a, 31b, 31c.

Furthermore, in a portion of the inner peripheral face of the shank part 13c adjacent to the slide portion 13g and closer to the first side in the longitudinal direction than the slide portion 13g, a second non-slide portion 13j is formed to be larger in inner diameter than the slide portion 13g, and is out of sliding contact with the first to third land parts 31a, 31b, 31c.

Each retard port 34 and each advance port 35 have respective inside openings facing the valve hole 13a, and respective outside openings communicating in a radial direction with the retard passage hole 19 (see FIG. 1) and the advance passage hole 20 (see FIG. 1) respectively.

The sleeve 30 is formed of a synthetic resin material or a metal material in a cylindrical shape, wherein the sleeve 30 includes a sleeve body 36, and a flange part 37 formed at an end of the sleeve body 36 closer to the second side in the longitudinal direction.

The sleeve body 36 includes a partition wall 36a formed integrally inside to divide the inside of the sleeve body 36 into a first sleeve oil passage 38 and a second sleeve oil passage 39 which extend in the longitudinal direction. The sleeve body 36 includes a valve accommodation recess 40 inside adjacent to the flange part 37.

As shown in FIG. 3, the partition wall 36a has a cross-shaped cross section taken along a plane extending radially. The first sleeve oil passage 38 has an opening closer to the second side in the longitudinal direction which communicates with the valve accommodation recess 40. The partition wall 36a is formed integrally with a first end wall 36b at a position overlapping with the retard port 34 to face the retard port 34 in a radial direction, wherein the first end wall 36b is structured close a longitudinal end of the first sleeve oil passage 38 farther from the valve accommodation recess 40.

The partition wall 36a is further formed integrally with a second end wall 36d at a longitudinal end of the partition wall 36a closer to the valve accommodation recess 40, wherein the second end wall 36d is structured to close a longitudinal end of the second sleeve oil passage 39 closer to the flange part 37. The second sleeve oil passage 39 has an opening closer to the first side in the longitudinal direction which communicates with a drain passage 66 formed inside a cylindrical member 56 described below.

Two first sleeve oil passages 38 and two second sleeve oil passage 39 are formed to extend in parallel with each other in the longitudinal direction of the valve body 13, and in a radial sectional view, are symmetrically positioned by the cross-shaped partition wall 36a, namely, the two first sleeve oil passages 38 are positioned symmetrical at intervals of 180°, and the two second sleeve oil passages 39 are positioned symmetrical at intervals of 180°. Furthermore, the first sleeve oil passages 38 and the second sleeve oil passages 39 are each formed by the partition wall 36a to have a fan shape in its radial cross-sectional view, thereby ensuring a large passage cross-sectional area.

The sleeve body 36 is formed with an inlet port 38a at the longitudinal end of the first sleeve oil passage 38, wherein the inlet port 38a faces the valve accommodation recess 40. The sleeve body 36 is formed with a rectangular first opening hole 36c close to the first end wall 36b, wherein the first opening hole 36c is opened to the first sleeve oil passage 38, and extends through in the radial direction. The first opening hole 36c is structured to communicate with each retard port 34 and each advance port 35 via a first spool oil passage 52 and a second spool oil passage 54 described below of the spool valve 31.

The sleeve body 36 is further formed with a rectangular second opening hole 36e close to the second end wall 36d, wherein the second opening 36e faces the second sleeve oil passage 39, and extends through in the radial direction. The second opening hole 36e causes the advance port 35 to communicate with the second sleeve oil passage 39, depending on the position of the spool valve 31 traveling. One end of the second sleeve oil passage 39 in the longitudinal direction is formed with a discharge port 36f that communicates with the oil pan 28 via the drain passage 66 of the cylindrical member 56 described below and the drain passage 29.

Furthermore, the first end wall 36b has a first inclined face 36g structured to guide working oil from the retard port 34 or the advance port 35 toward the first sleeve oil passage 38 via the spool valve 31. The first inclined face 36g is inclined such that thickness of the first end wall 36b gradually decreases toward its outer end in the radial direction of the valve body 13.

Similarly, the second end wall 36d has a second inclined face 36h structured to guide working oil from the advance port 35 toward the second sleeve oil passage 39 via the spool valve 31. The second inclined face 36h is inclined such that thickness of the second end wall 36d gradually decreases toward its outer end in the radial direction of the valve body 13.

As shown in FIG. 4, the flange part 37 is arranged inside an annular groove 13k formed in an inner peripheral face of a tip portion of the shank part 13c. The flange part 37 is arranged and sandwiched in the longitudinal direction between a spring retainer 41 and a valve seat 43 described below, wherein one end part of the helical compression spring 32 in the longitudinal direction is in pressing contact with the spring retainer 41.

Specifically, the spring retainer 41 is formed in an annular shape of a metal plate, and is bent in a substantially L-shaped cross section such that an outer peripheral portion of the spring retainer 41 extends in the longitudinal direction, wherein the spring retainer 41 includes a large-diameter insertion hole 41a in its center which extends through in the longitudinal direction. The outer peripheral face of the spring retainer 41 is press-fitted in the inner peripheral face of the annular groove 13k, wherein an annular front end wall of the spring retainer 41 abuts on a step face 13m of the annular groove 13k via an O-ring 42 in the longitudinal direction. The flange part 37 has an outer diameter set smaller than an inner diameter of the outer peripheral portion of the spring retainer 41.

Therefore, after assembly, a radial clearance is formed between the outer peripheral face of the flange part 37 and the outer peripheral portion of the spring retainer 41. Furthermore, a longitudinal clearance is formed between the front end face of the flange part 37 and the face of the valve seat 43 facing the front end face of the flange part 37 in the longitudinal direction. The provision of the radial and longitudinal clearances serves to hold the whole of the sleeve 30 while allowing the sleeve 30 to slightly move in the radial and longitudinal directions with respect to the valve body 13.

The valve accommodation recess 40 accommodates a first check valve 45 structured to allow an inflow of working oil only in a direction from the supply passage 44 to the first sleeve oil passage 38. The first check valve 45 includes: a valve member 46; a valve seat 43 which the valve member 46 is detached from and seated on; and a check spring 47 structured to bias the valve member 46 toward the valve seat 43.

The valve member 46 is formed of a metal material having a relatively high hardness, such as an iron-based metal material, in a substantially cup shape by press molding.

Specifically, as shown in FIG. 4, the valve member 46 includes: a convex valve part 48 that is detached from and seated on the valve seat 43; and a guide part 49 extending in the longitudinal direction from an outer periphery of one end of the valve part 48, and including an outer peripheral face that is guided by an inner wall face of the valve accommodation recess 40 with a minute clearance.

The valve part 48 includes an outer peripheral face 48b excluding a first planar portion 48a that is a tip face of the valve part 48, wherein the outer peripheral surface 48b is formed in a partially spherical shape. The first planar portion 48a receives hydraulic pressure of working oil in the direction from the supply passage 44 to the first sleeve oil passage 38. On the other hand, the outer peripheral face 48b is in contact with or apart from an inner peripheral edge of one end portion of the passage hole 43a of the valve seat 43 closer to the first side in the longitudinal direction, namely, is detached from and seated on the valve seat 43. Furthermore, the valve part 48 has a second planar portion 48c formed in a side opposite to the first planar portion 48a. The second planar portion 48c is biased toward the second side in the longitudinal direction by the check spring 47.

The guide part 49 is composed of four guide pieces 49a arranged alternately with a plurality of slit-shaped gaps 49b (four in the present embodiment), extending in the longitudinal direction from a rear end of the valve part 48. The gaps 49b are evenly spaced at intervals of 90° in the circumferential direction, and are formed in a substantially U-shape extending from the rear end of the valve part 48. The guide piece 49a has a tip portion 49c that abuts on the longitudinal end face of the second end wall 36d when the valve member 46 moves toward the first side in the longitudinal direction by the hydraulic pressure acting on the first planar portion 48a against the biasing force of the check spring 47.

The valve seat 43 is formed to have a disc plate shape, and formed with a passage hole 43a at a central portion bulging and deformed toward the valve member 46, wherein the passage hole 43a extends through in the longitudinal direction. Furthermore, the valve seat 43 is arranged such that an outer peripheral portion of the valve seat 43 is inserted in the longitudinal direction inside the inner periphery of the annular groove 13k. Then, where the valve seat 43 is suppressed via a filter 51 by the C-shaped first stopper member 50 from being released to the outside, a front end face of the outer peripheral portion of the valve seat 43 abuts on the longitudinal end of the outer peripheral portion of the spring retainer 41.

The valve member 46 is configured to open and close the passage hole 43a by being released from and being seated on the peripheral edge of the passage hole 43a.

The check spring 47 is set to have a spring force such that the check spring 47 is compressed and deformed by a predetermined hydraulic pressure that acts on the first planar portion 48a of the valve member 46 from the passage hole 43a, and the valve member 46 is moved backward to the first side in the longitudinal direction to open the passage hole 43a.

The first stopper member 50 is formed of a metal material in a substantially C-shape. The first stopper member 50 has an outer peripheral portion that is fitted into a recess 13n formed in the inner peripheral face of the annular groove 13k, and prevents the filter 51, the valve seat 43, and others from moving to the second side in the longitudinal direction and being released to the outside of the cam bolt 13. The first stopper member 50 is formed with a communication hole 50a at its center, wherein the communication hole 50a provides communication between the supply passage 44 and the passage hole 43a.

The filter 51 is sandwiched and fixed between the valve seat 43 and the first stopper member 50. This filter 51 is of a typical type in which an outer peripheral part 51a is sandwiched and fixed between the first stopper member 50 and the valve seat 43, and includes a filter part 51b in its central portion for collecting dust or the like in working oil passing through the filter part 51b.

The O-ring 42 is made of rubber and is arranged between the step face 13m of the annular groove 13k and the spring retainer 41. The O-ring 42, by its elastic force, presses the first stopper member 50 against a wall face of the recess 13n closer to the second side in the longitudinal direction, via the spring retainer 41, the valve seat 43, and the filter 51, thereby suppressing rattling of the spring retainer 41 and others in the longitudinal direction. Furthermore, the O-ring 42 liquid-tightly seals between the spring retainer 41 and the annular groove 13k.

As shown in FIGS. 3 and 4, the spool valve 31 is formed in a substantially cylindrical shape, and is structured such that the inner peripheral face of the spool valve 31 can slide on the outer peripheral face of the sleeve body 36 in the longitudinal direction. Furthermore, the spool valve 31 has the first to third land parts 31a, 31b and 31c in outer peripheral faces of a first end portion closer to the first side in the longitudinal direction, a central portion in the longitudinal direction, and a second end portion closer to the second side in the longitudinal direction, respectively. The width of the first land part 31a in the longitudinal direction of the valve body 13 is set smaller than those of the second and third land parts 31b and 31c.

The first spool oil passage 52 is formed between the first land part 31a and the second land part 31b, and extends through in the radial direction to cause the retard port 34 to communicate with the first sleeve oil passage 38 or a drain passage 53 described below.

The first spool oil passage 52 includes: a first inner annular groove 52a formed in the inner peripheral face of the spool valve 31; a first outer annular groove 52b formed in the outer peripheral face of the spool valve 31; and a plurality of first communication holes 52c (four in the present embodiment) that allow the first inner annular groove 52a to communicate with the first outer annular groove 52b.

The length of the first inner annular groove 52a in the longitudinal direction of the valve body 13 is set larger than that of the first outer annular groove 52b. A second check valve 58 described below is provided on the bottom face of the first inner annular groove 52a.

The first outer annular groove 52b is formed in a position that overlaps with the first inner annular groove 52a to face the first inner annular groove 52a in the radial direction, and communicates with the retard port 34 or the drain passage 53 described below depending on movement of the spool valve 31 in the longitudinal direction.

The first communication holes 52c are located in a central position of the first inner annular groove 52a and the first outer annular groove 52b in the longitudinal direction. The first communication holes 52c are evenly spaced at intervals of 90° in the circumferential direction.

Furthermore, the second spool oil passage 54 is formed between the second land part 31b and the third land part 31c, and extends through in the radial direction to cause the first sleeve oil passage 38 to communicate with the retard port 34 or the advance port 35.

The second spool oil passage 54 includes: a second inner annular groove 54a formed in the inner peripheral face of the spool valve 31; a second outer annular groove 54b formed in the outer peripheral face of the spool valve 31; and a plurality of second communication holes 54c (four in the present embodiment) that allow the second inner annular groove 54a to communicate with the second outer annular groove 54b.

The second inner annular groove 54a and the second outer annular groove 54b are shaped similarly, and smaller in size in the longitudinal direction of the valve body 13 than the first outer annular groove 52b.

The second communication holes 54c are located in a central position of the second inner annular groove 54a and the second outer annular groove 54b in the longitudinal direction. The second communication holes 54c are evenly spaced at intervals of 90° in the circumferential direction.

A cylindrical spacer 55 made of a metal material is provided between the spring retainer 41 and a second end of the spool valve 31 closer to the second side in the longitudinal direction. The spacer 55 has an inner diameter set slightly larger than the outer diameter of the sleeve body 36. On the other hand, the outer diameter of the spacer 55 is set smaller than the inner diameter of the slide portion 13g of the valve body 13. The spacer 55 is arranged such that its inner peripheral face is in contact with the outer peripheral face of one end portion of the sleeve 30 with a predetermined clearance. The spacer 55 further includes a first end face closer to the first side in the longitudinal direction which is constantly in contact with the helical compression spring 32 described below, while a second end face of the spacer 55 closer to the second side in the longitudinal direction is constantly in contact with the opposite face of the spring retainer 41 facing the spacer 55. The length of the spacer 55 in the longitudinal direction is such that the first end part of the spacer 55 closer to the first side in the longitudinal direction does not close the second opening hole 36e of the sleeve body 36 in a state where the second end face of the spacer 55 closer to the second side in the longitudinal direction is in contact with the opposite face of the spring retainer 41.

The helical compression spring 32 as a biasing member is arranged between the spool valve 31 and the spacer 55 such that a first end of the compressed coil spring 32 closer to the first side in the longitudinal direction is in contact with the second end face of the spool valve 31 closer to the second side in the longitudinal direction, and a second end of the compressed coil spring 32 closer to the second side in the longitudinal direction is in contact with the first end face of the spacer 55 closer to the first side in the longitudinal direction. Accordingly, the helical compression spring 32 serves to bias the spool valve 31 toward the first side in the longitudinal direction.

The cylindrical member 56 is provided at the first end face of the spool valve 31 closer to the first side in the longitudinal direction, and is structured to receive a pressing force of the electromagnetic actuator 33 toward the sleeve 30, and transmit the pressing force to the spool valve 31.

The cylindrical member 56 is integrally formed of a metal material, and as shown in FIGS. 3 and 4, has a larger outer diameter portion and a smaller outer diameter portion arranged in the longitudinal direction. The cylindrical member 56 includes: a larger diameter tubular portion 56b closer to the spool valve 31 than a step portion 56a located substantially at a center of the cylindrical member 56; and a smaller diameter tubular portion 56c closer to a push rod 62 of the electromagnetic actuator 33 than the step portion 56a.

The larger diameter tubular portion 56b has an open end face in contact in the longitudinal direction with the first end face of the spool valve 31 closer to the first side in the longitudinal direction, and is slidably fitted to an outer periphery of a first end portion of the sleeve body 36 closer to the first side in the longitudinal direction.

The smaller diameter tubular portion 56c is formed in a bottomed shape, wherein a pushing part 62a of the push rod 62 of the electromagnetic actuator 33 is in contact in the longitudinal direction with a tip face of a bottom wall 56d of the smaller diameter tubular portion 56c. When the electromagnetic actuator 33 is energized with a maximum electricity of energization, the smaller diameter tubular portion 56c holds the spool valve 31 in a predetermined position in the longitudinal direction (position in FIG. 4), in cooperation with the spring force of the helical compression spring 32. The smaller diameter tubular portion 56c is further formed with a plurality of drain holes 56e (four in the present embodiment) extending through in the radial direction for discharging working oil, which has passed through the second sleeve oil passage 39, to the outside. The drain holes 56e are evenly spaced at intervals of 90° in the circumferential direction of the cylindrical member 56, wherein each drain hole 56e has a circular shape as viewed in the radial direction.

The cylindrical member 56, the first land part 31a of the spool valve 31, and the second non-sliding portion 13j of the valve body 13 form a space thereamong, wherein the space serves as the drain passage 53 structured to communicate with the retard port 34 via the first outer annular groove 52b when the spool valve 31 moves toward the first side in the longitudinal direction due to the biasing force of the helical compression spring 32. The drain passage 53 receives supply of hydraulic pressure from each retard hydraulic chamber 9 via the retard port 34 and the first outer annular groove 52b. The hydraulic pressure supplied to the drain passage 53 is drained to the drain passage 29 through a gap between a communication hole 57a described below of the second stopper member 57 and the outer peripheral face of the smaller diameter tubular portion 56c.

The second stopper member 57 is provided at the first end portion of the valve body 13 including the head part 13b. The second stopper member 57 is formed of a metal material in a substantially C-shape, and has an outer peripheral portion fitted into an annular groove portion formed in the inner peripheral face of the second non-sliding portion 13j, so that the cylindrical member 56 and others are suppressed from moving to the first side in the longitudinal direction and being released to the outside of the valve body 13. The second stopper member 57 has a substantially circular communication hole 57a extending through in the longitudinal direction. The communication hole 57a has an inner diameter set larger than the outer diameter of the smaller diameter tubular portion 56c. Accordingly, the smaller diameter tubular portion 56c can move through the communication hole 57a in the longitudinal direction.

The second check valve 58 allows a flow of working oil in the first spool oil passage 52 from the first outer annular groove 52b to the first inner annular groove 52a, and restricts a flow of hydraulic fluid from the first inner annular groove 52a to the first outer annular groove 52b. As shown in FIG. 5, the second check valve 58 is formed by rolling a thin metal sheet in a manner that both ends of the metal sheet in its circumferential direction overlap each other, so that the diameter of the second check valve 58 can be reduced and increased.

At both ends of the second check valve 58 in the longitudinal direction (both ends in the horizontal direction in FIG. 5), a plurality of communication holes 58a are formed and evenly spaced in the circumferential direction, and cause an inner peripheral side of the second check valve 58 to communicate with an outer peripheral side of the second check valve 58. The second check valve 58 is arranged in the first inner annular groove 52a with its outer peripheral face in pressing contact with the bottom surface of the first inner annular groove 52a of the first spool oil passage 52. In this state, the first communication hole 52c of the first spool oil passage 52 overlaps with a central region of the second check valve 58 in the longitudinal direction to face the central region in the radial direction, wherein the central region is a region where no communication hole 58a is formed. The communication between the first communication hole 52c and the first inner annular groove 52a is blocked by the contact between the outer peripheral face of the second check valve 58 and the bottom surface of the first inner annular groove 52a. The second check valve 58 is structured to contract in diameter, when a predetermined hydraulic pressure acts on the longitudinally central region of the second check valve 58 from the retard port 34 via the first outer annular groove 52b and the first communication hole 52c. Due to the reduction of the diameter of the second check valve 58, working oil flows between the bottom surface of the first inner annular groove 52a and the outer peripheral face of the second check valve 58 to both sides of the second check valve 58 in the longitudinal direction, and passes through each communication hole 58a, and flows into the first inner annular groove 52a and the first sleeve oil passage 38.

As shown in FIG. 1, the electromagnetic actuator 33 is generally composed of a casing 59, a solenoid 60, a movable core 61, and the push rod 62.

The casing 59 is made of a synthetic resin material, and includes: a bracket 59a integrally formed at its lower end portion, wherein the bracket 59a is fixed to the cylinder head; a connector part 59b at its upper end portion, wherein the connector part 59b is electrically connected to a control unit 63 that is an ECU. One end of each of a pair of terminal pieces 59c of the connector part 59b is connected to the solenoid 60, wherein the terminal pieces 59c are substantially entirely embedded in the casing 59. On the other hand, the other end of each of the terminal pieces 59c exposed to the outside is connected to a terminal of a male connector of the control unit 63. The casing 59 is liquid-tightly held in a holding groove of the cylinder head via a seal ring 64 provided at its front end side.

The movable core 61 has a cylindrical shape, and is mounted inside a bobbin 65 so as to slide in the longitudinal direction. When the solenoid 60 is de-energized, the movable core 61 is moved backward in a direction from the second side to the first side in the longitudinal direction by the spring force of the helical compression spring 32 via the spool valve 31, the cylindrical member 56, and the push rod 62.

The solenoid 60 is mounted inside the casing 59 via the bobbin 65 made of a magnetic material. When the solenoid 60 is energized by the control unit 63 and then excited, the solenoid 60 causes the movable core 61 to move forward, namely, causes the spool valve 31 to move toward the second side in the longitudinal direction against the spring force of the helical compression spring 32.

The push rod 62 is coupled integrally with a tip end portion of the movable core 61, and includes the pushing part 62a at its tip end portion, wherein the pushing part 62a is in contact in the longitudinal direction with the bottom wall 56d of the small-diameter cylindrical portion 56c of the cylindrical member 56.

The spool valve 31 is controlled to move continuously from a position shown in FIG. 4 closest to the second side in the longitudinal direction to a position closest to the first side in the longitudinal direction, in accordance with de-energization of the solenoid 60 and the amount of electricity to energize the solenoid 60.

Namely, the position of the spool valve 31 is controlled to travel continuously from a first position to a fourth position by pressing the movable core 61 and pushing part 62a toward the second side in the longitudinal direction against the spring force of the compressed coil spring 32 in accordance with de-energization of the solenoid 60 and the amount of electricity to energize the solenoid 60 by the control unit 63.

The control unit 63 includes an internal computer to receive input of informational signals from various sensors such as a crank angle sensor (engine speed sensing), an air flow meter, an engine water temperature sensor, an engine temperature sensor, a throttle valve opening sensor, and a cam angle sensor not shown, wherein the cam angle sensor senses a current rotational phase of the camshaft 2. Thereby, the current engine operating state is determined.

Furthermore, the control unit 63 outputs a pulse signal to the solenoid 60 to control the amount of electricity (duty ratio) to control the spool valve 31 continuously variably from the first position to a third position, or to control the spool valve 31 to the fourth position by shutting off the energization of the solenoid 60 of the electromagnetic actuator 33.

In FIG. 4, the control valve 27 is in a first state where the spool valve 31 is arranged such that the second spool oil passage 54 is closer to the second side in the longitudinal direction than the first spool oil passage 52, as the spool valve 31 has traveled toward the second side in the longitudinal direction against the biasing force of the helical compression spring 32, the retard port 34 communicates with the advance port 35 via the first spool oil passage 52, the first sleeve oil passage 38, and the second spool oil passage 54. Namely, the spool valve 31 is in a quick response mode in which the spool valve 31 can quickly raise the internal pressure of each advance hydraulic chamber 10 via each retard port 34 and each advance port 35, and quickly cause the vane rotor 7 to rotate relatively to the most advanced side.

Figure 6:
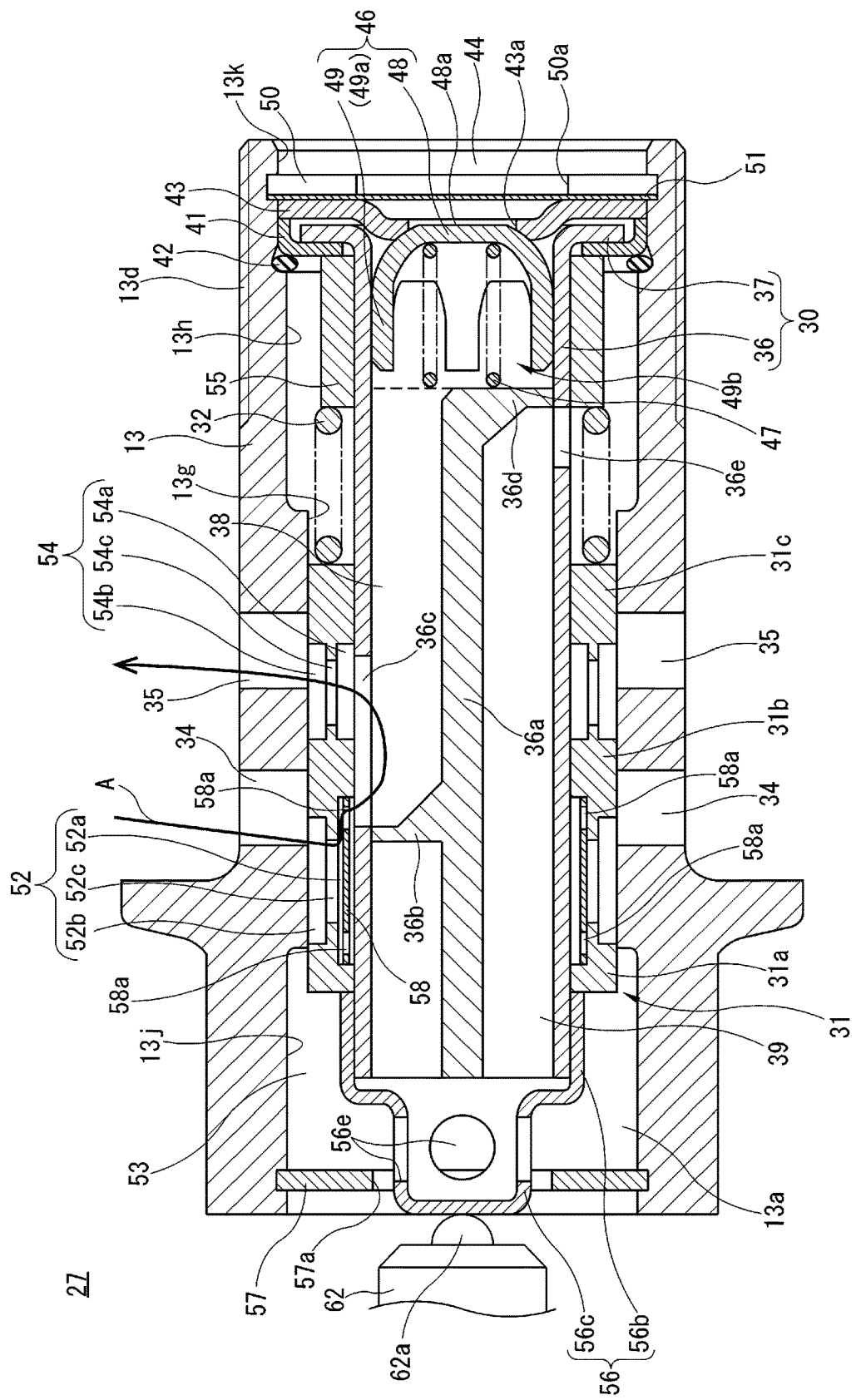
FIG. 6 is a longitudinal sectional view of a spool valve of the control valve according to the present embodiment when the spool valve is in its first position.
Figure 7:
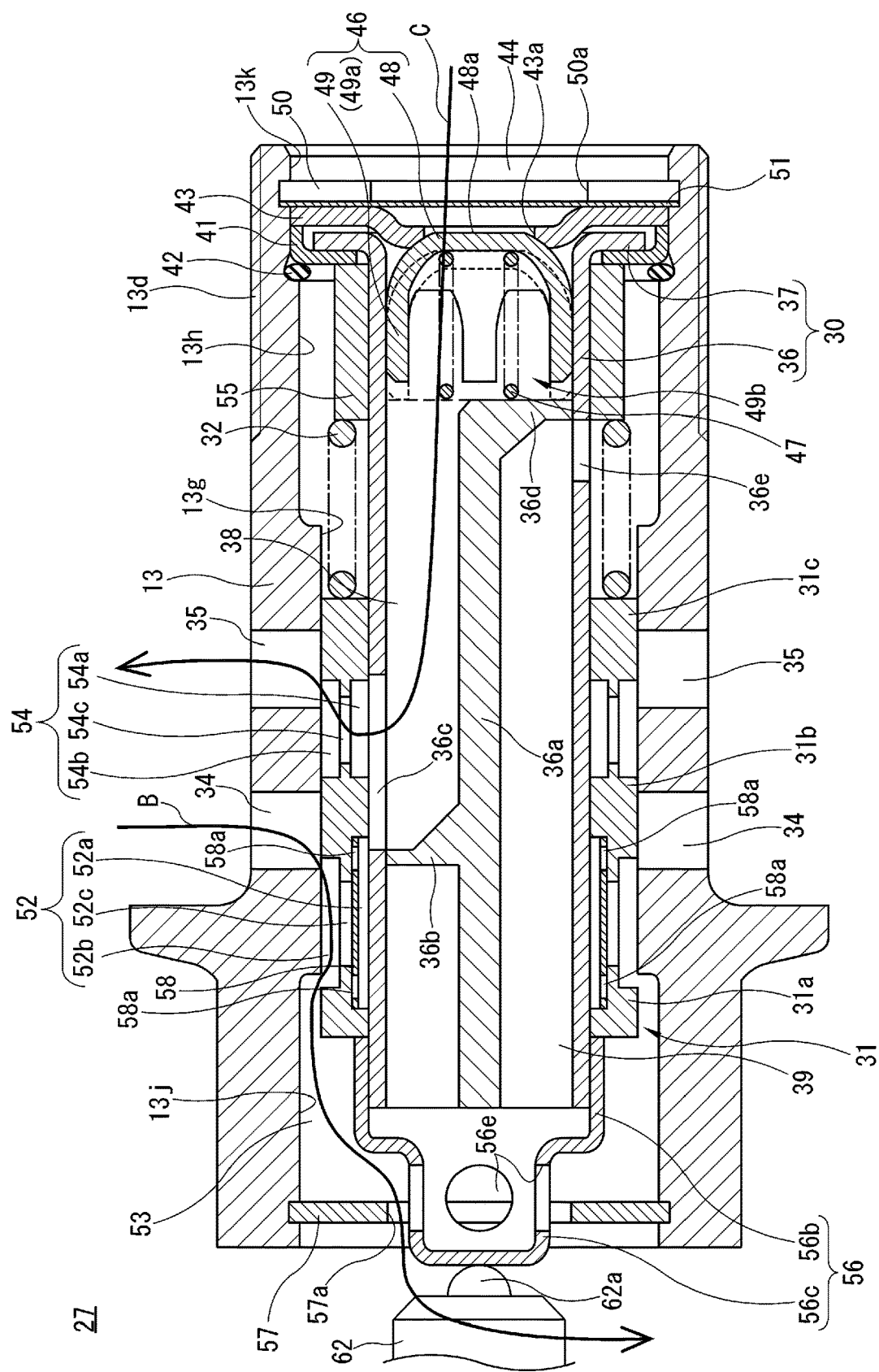
FIG. 7 is a longitudinal sectional view of the spool valve of the control valve according to the present embodiment when the spool valve is in its second position.
Figure 8:
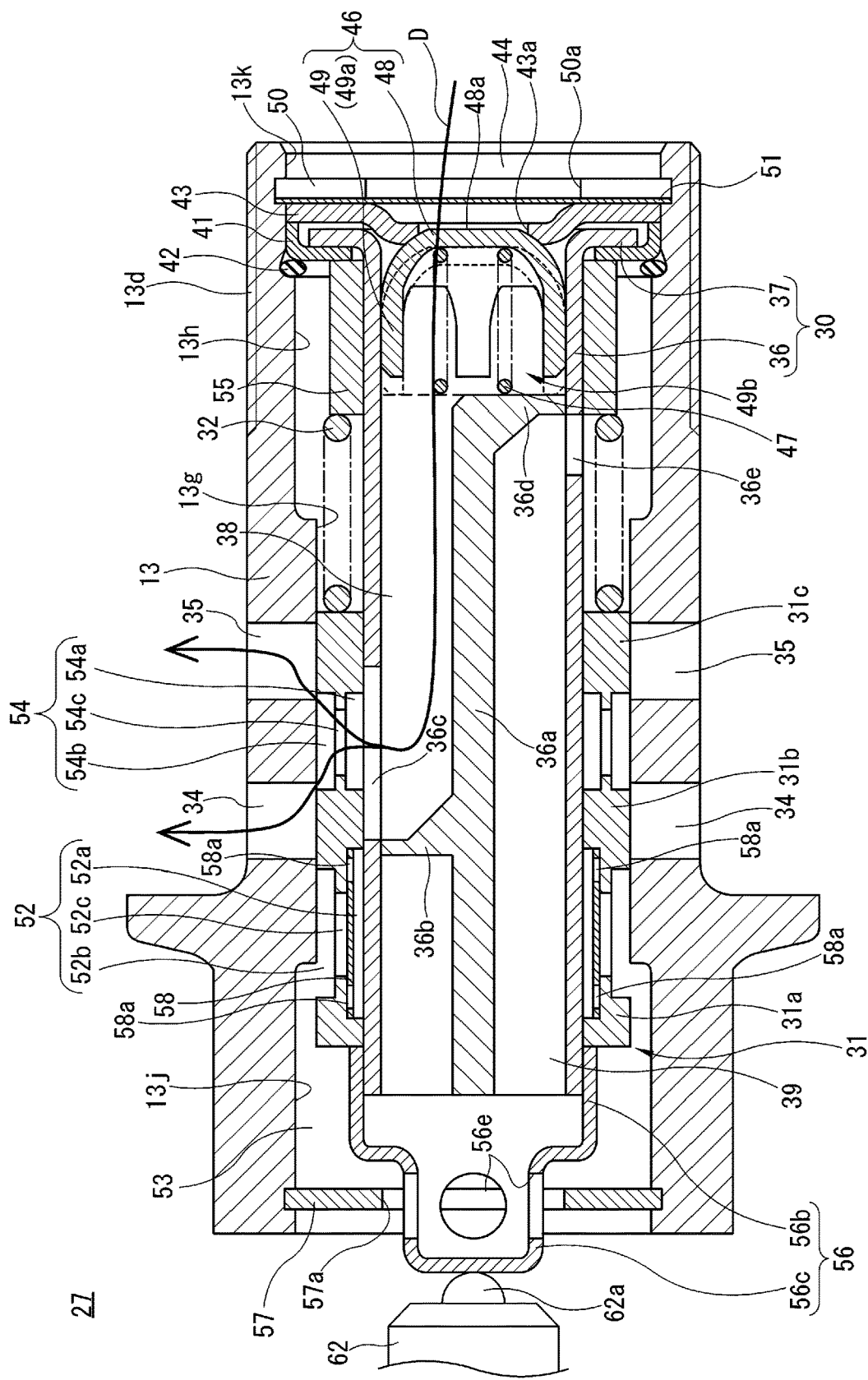
FIG. 8 is a longitudinal sectional view of the spool valve of the control valve according to the present embodiment when the spool valve is in its third position.
Figure 9:
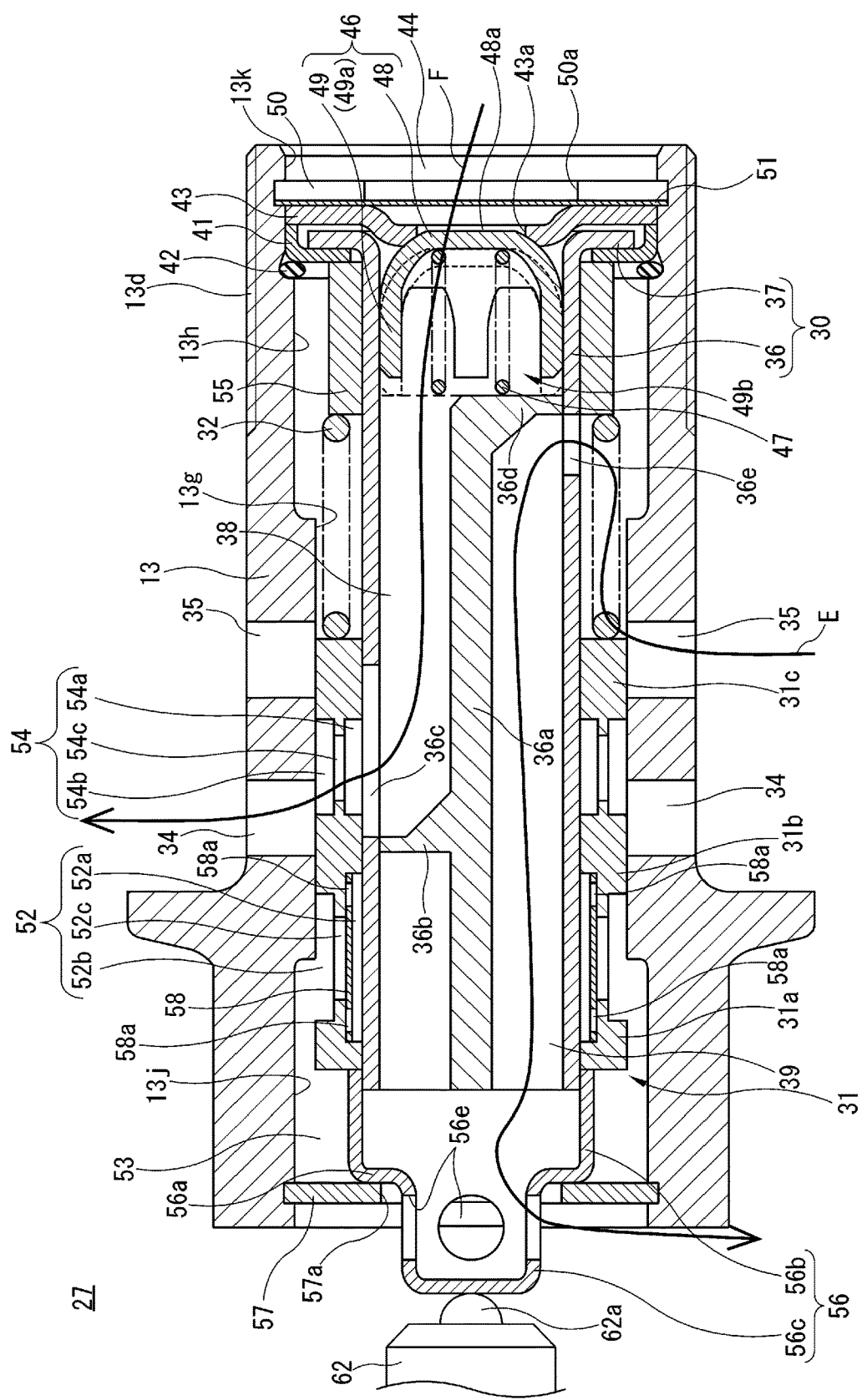
FIG. 9 is a longitudinal sectional view of the spool valve of the control valve according to the present embodiment when the spool valve is in its fourth position.

<Operation of Valve Timing Control Device of Present Embodiment Applied to Intake Valve Side> FIG. 6 is a longitudinal sectional view of the spool valve 31 of the hydraulic control valve 27 according to the present embodiment when the spool valve 31 is in its first position. FIG. 7 is a longitudinal sectional view of the spool valve 31 of the hydraulic control valve 27 according to the present embodiment when the spool valve is in its second position. FIG. 8 is a longitudinal sectional view of the spool valve 31 of the hydraulic control valve 27 according to the present embodiment when the spool valve is in its third position. FIG. 9 is a longitudinal sectional view of the spool valve 31 of the hydraulic control valve 27 according to the present embodiment when the spool valve is in its fourth position.

For example, when an accelerator pedal is rapidly depressed for rapid acceleration of a vehicle, the amount of electricity (duty ratio) from the control unit 63 to the solenoid 60 is increased to near the maximum. In this situation, as shown in FIG. 6, the spool valve 31 is located in a position closest to the second side in the longitudinal direction by being pressed by the movable core 61 and the pushing part 62a against the spring force of the helical compression spring 32 (first position). Therefore, the first land part 31a of the spool valve 31 closes the drain passage 53 and blocks communication of the drain passage 53 with the first outer annular groove 52b and the retard port 34, thereby stopping drainage of hydraulic pressure in each retard hydraulic chamber 9. Simultaneously, the retard port 34 communicates with the first communication hole 52c via the first outer annular groove 52b.

The hydraulic pressure in each retard hydraulic chamber 9 acts on the outer peripheral face of the second check valve 58 via the retard port 34, the first outer annular groove 52b, and the first communication hole 52c. Then, when the internal pressure of each retard hydraulic chamber 9 is increased by the alternating torque of the camshaft 2, the second check valve 58, which has been in contact with the bottom surface of the first inner annular groove 52a, is deformed and reduced in diameter by the hydraulic pressure, thereby causing the first communication hole 52c and the first inner annular groove 52a to communicate with each other through the communication holes 58a of the second check valve 58. Accordingly, the hydraulic pressure in each retarded hydraulic chamber 9 flows into the first sleeve oil passage 38 via the first outer annular groove 52b, the first communication hole 52c, each communication hole 58a, the first inner annular groove 52a, and the first opening 36c, as shown by an arrow A in FIG. 6. Then, from the first sleeve oil passage 38, the hydraulic pressure is promptly supplied to each advance hydraulic chamber 10 through the second inner annular groove 54a, the second communication hole 54c, and the second outer annular groove 54b. In this way, the internal pressure of each advance hydraulic chamber 10 can be quickly increased, and the vane rotor 7 can be quickly relatively rotated toward the most advanced side (quick response mode).

When the engine is in a high speed and high load region, the control unit 63 supplies a smaller amount of electricity to the solenoid 60 than that at the time of rapid acceleration described above. Accordingly, as shown in FIG. 7, the spool valve 31 is moved toward the first side in the longitudinal direction by the biasing force of the helical compression spring 32 against the pressing force of the movable core 61 and the pushing part 62a (second position). As a result, the retard port 34 communicates with the drain passage 53 via the first outer annular groove 52b, and the advance port 35 communicates with the first sleeve oil passage 38 via the second outer annular groove 54b, the second communication hole 54c, the second inner annular groove 54a, and the first opening 36c.

As shown by an arrow B in FIG. 7, the hydraulic pressure in each retard hydraulic chamber 9 flows to the drain passage 53 via each retard port 34 and the first outer annular groove 52b, and then is drained from the drain passage 53 to the outside of the valve body 13 via a gap between the communication hole 57a of the stopper member 57 and the smaller diameter tubular portion 56c. Therefore, the pressure inside each retardation hydraulic chamber 9 becomes low.

The hydraulic pressure discharged from the oil pump 26 to the discharge passage 26a passes through the supply passage 44, the communication hole 50a of the first stopper member 50, and the filter part 51b (see FIG. 3) of the filter 51, and acts on the first planar portion 48a of the valve part 48 of the valve member 46. As a result, as shown by broken lines in FIG. 7, the valve member 46 moves toward the first side in the longitudinal direction of the valve body 13 against the biasing force of the check spring 47, and comes into contact with the longitudinal end face of the second end wall 36d. With the movement of the valve member 46, the valve part 48 is detached from the valve seat 43, and the hydraulic pressure flows into the first sleeve oil passage 38 via a gap between the valve part 48 and the valve seat 43 and each slit-shaped gap 49b between the guide pieces 49a, 49a, as shown by an arrow C in FIG. 7. Then, from the first sleeve oil passage 38, the hydraulic pressure is supplied to each advance hydraulic chamber 10 via the first opening hole 36c, the second inner annular groove 54a, the second communication hole 54c, the second outer annular groove 54b, and the advance port 35. Therefore, the pressure inside each advance hydraulic chamber 10 becomes high.

Furthermore, when the engine is in steady operation, the control unit 63 supplies a smaller amount of electricity to the solenoid 60 than that in the high speed and high load region described above. Accordingly, as shown in FIG. 8, the spool valve 31 is further moved toward the first side in the longitudinal direction by the biasing force of the helical compression spring 32 against the pressing force of the movable core 61 and the pushing part 62a (third position). As a result, both of the retard port 34 and the advance port 35 communicate with the first sleeve oil passage 38 via the second outer annular groove 54b, the second communication hole 54c, the second inner annular groove 54a, and the first opening hole 36c.

The hydraulic pressure, which has flown into the first sleeve oil passage 38 through the gap between the valve part 48 and the valve seat 43, flows through the first sleeve oil passage 38 as shown by an arrow D in FIG. 8. Then, as shown by an arrow D in FIG. 8, from the first sleeve oil passage 38, the hydraulic pressure flows into the retard ports 34 and the advance ports 35 via the first opening hole 36c, the second inner annular groove 54a, the second communication hole 54c, and the second outer annular groove 54b, and is supplied to the retard hydraulic chambers 9 and advance hydraulic chambers 10. Therefore, each retard hydraulic chamber 9 and each advance hydraulic chamber 10 become high-pressurized, thereby holding the vane rotor 7.

Furthermore, when the engine is stopped from the steady operation by turning off an ignition switch, the control unit 63 cuts off the electricity to the solenoid 60.

Accordingly, as shown in FIG. 9, the spool valve 31 is held at a position closest to the first side in the longitudinal direction by the biasing force of the helical compression spring 32 (fourth position). When in this fourth position, the step portion 56a of the cylindrical member 56 is in contact with the periphery of the communication hole 57a of the second stopper member 57.

In this state, the retard port 34 communicates with the first sleeve oil passage 38 via the second outer annular groove 54b, the second communication hole 54c, the second inner annular groove 54a, and the first opening hole 36c. Simultaneously, the advance port 35 communicates with the second sleeve oil passage 39 via a gap in the helical compression spring 32 between the outer peripheral face of the sleeve 30 and the slide portion 13g of the valve body 13 and via the second opening hole 36e of the sleeve body 36. Therefore, as shown by an arrow E in FIG. 9, working oil in each advance hydraulic chamber 10 flows into the second sleeve oil passage 39 via the advance port 35, the gap in the helical compression spring 32, and the second opening hole 36e, and then flows from the second sleeve oil passage 39 into the drain passage 66 of the cylindrical member 56, and is drained to the outside of the valve body 13 via each drain hole 56e.

Next, when the ignition switch is turned on to start the engine, the oil pump 26 is also driven accordingly to discharge a hydraulic pressure to the discharge passage 26a, wherein the discharged hydraulic pressure flows through the supply passage 44, the communication hole 50a of the first stopper member 50, and the filter part 51b of the filter 51, and acts on the first planar portion 48a of the valve part 48 of the valve member 46. Accordingly, as shown by broken lines in FIG. 9, the valve member 46 moves toward the first side in the longitudinal direction of the valve body 13 against the biasing force of the check spring 47, and comes into contact with the longitudinal end face of the second end wall 36d. With the movement of the valve member 46, the valve part 48 is detached from the valve seat 43, and the hydraulic pressure flows into the first sleeve oil passages 38 via the gap between the valve part 48 and the valve seat 43 and each slit-shaped gap 49b between the guide pieces 49a, 49a, as shown by an arrow F in FIG. 9. Then, from the first sleeve oil passage 38, the hydraulic pressure is supplied to the retard hydraulic chambers 9 via the first opening hole 36c, the second inner annular groove 54a, the second communication hole 54c, the second outer annular groove 54b, and the retard port 34. Therefore, the pressure inside each retard hydraulic chamber 9 becomes high.

<Configuration of Valve Timing Control Device According to Present Embodiment Applied to Exhaust Valve Side>

Figure 10:
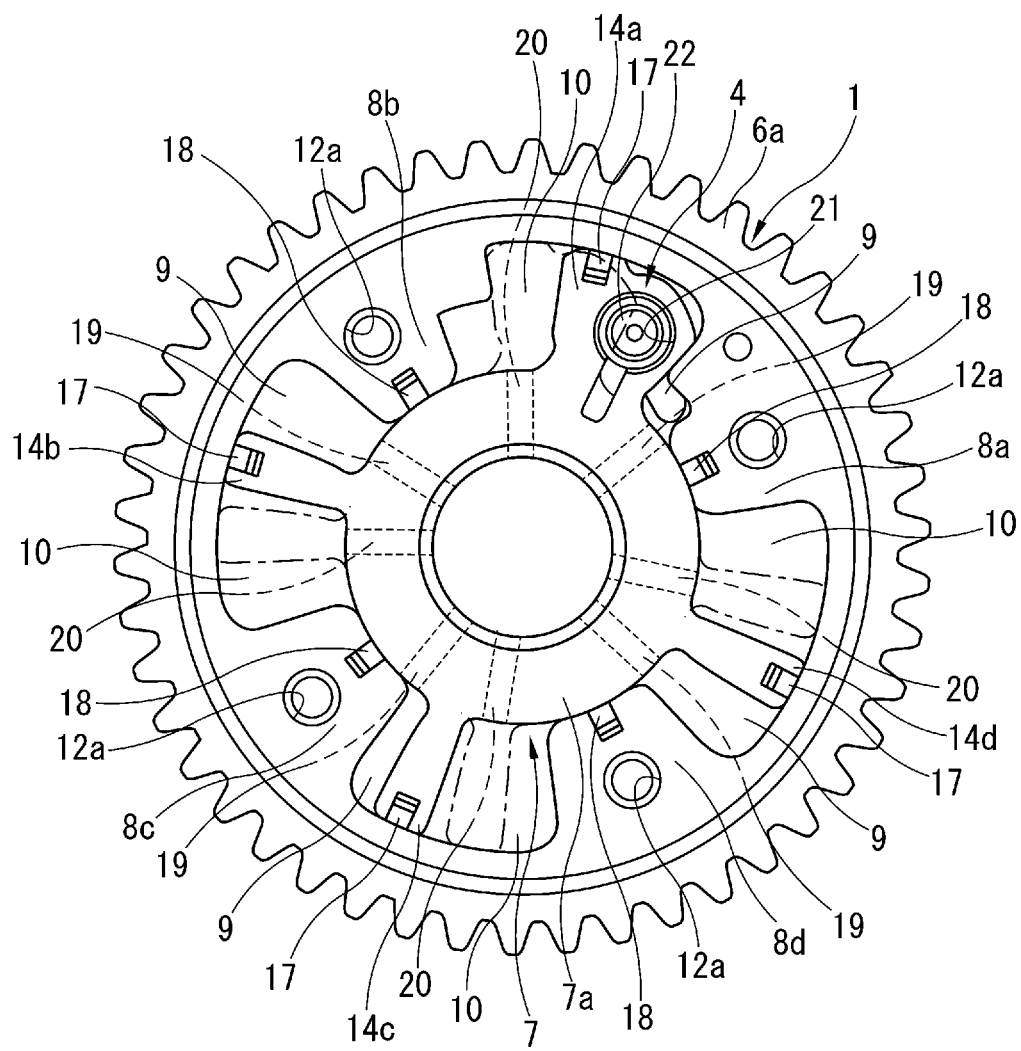
FIG. 10 is a front view of a valve timing control device according to an embodiment, which is applied to an exhaust valve side of an internal combustion engine when a front cover is removed.
Figure 11:
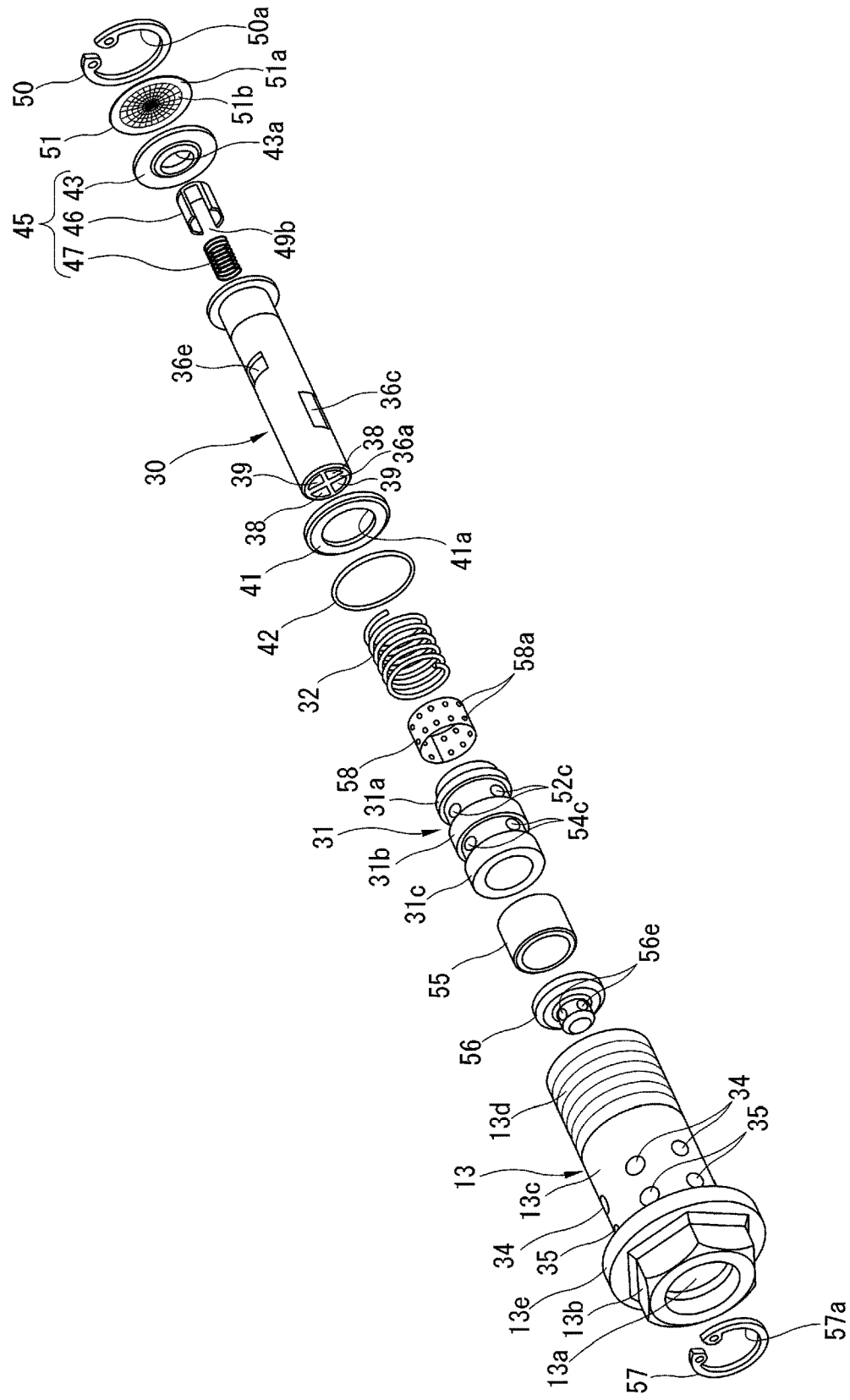
FIG. 11 is an exploded perspective view of a control valve according to the embodiment applied to the exhaust valve side of the internal combustion engine.
Figure 12:
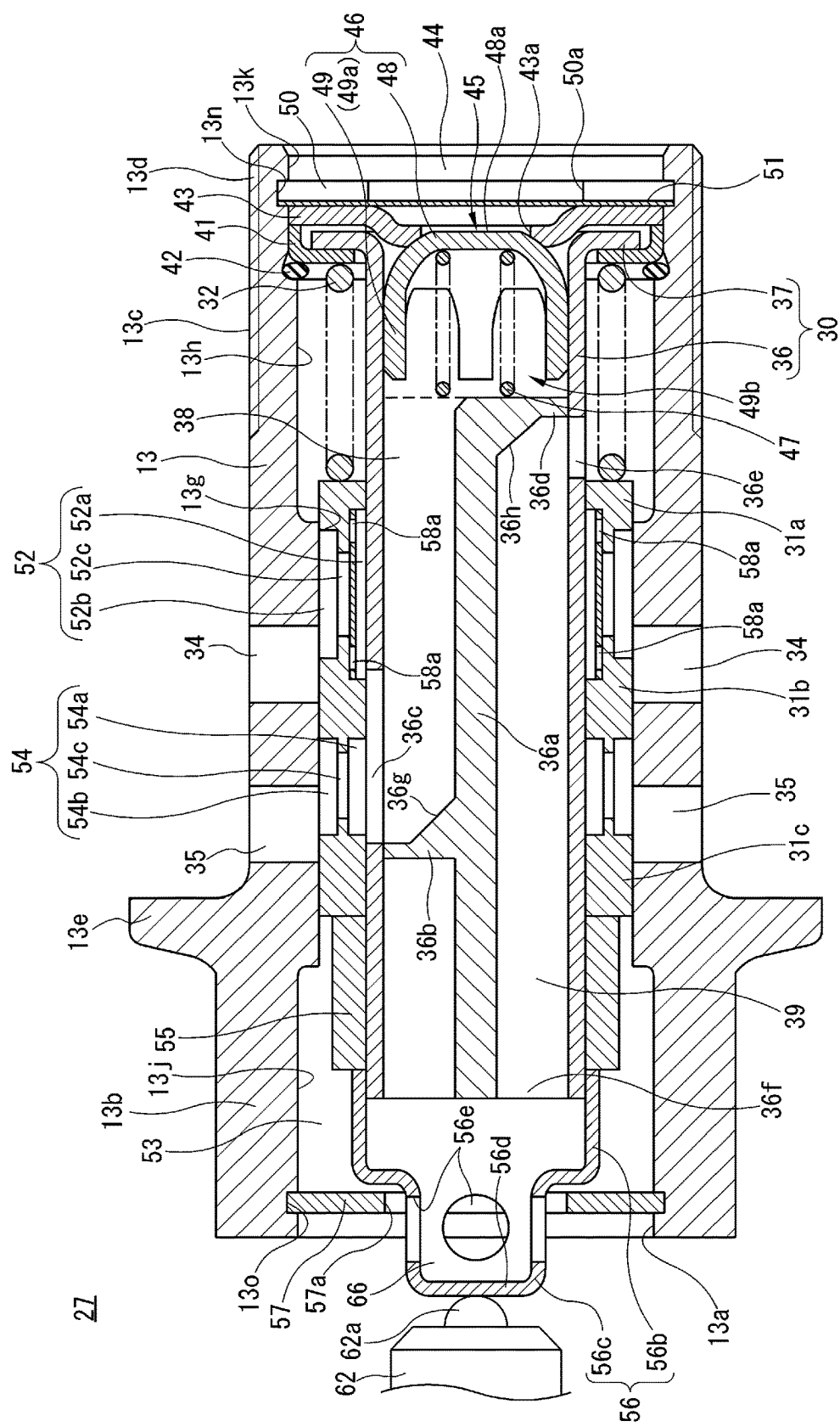
FIG. 12 is a longitudinal sectional view of the control valve according to the present embodiment when in a second state.

FIG. 10 is a front view of a valve timing control device according to an embodiment, which is applied to an exhaust valve side of an internal combustion engine when the front cover 11 is removed. FIG. 11 is an exploded perspective view of the control valve 27 according to the embodiment applied to the exhaust valve side of the internal combustion engine. FIG. 12 is a longitudinal sectional view of the control valve 27 according to the present embodiment when in a second state. The same reference numerals are used for components of the valve timing control device and the control valve 27 shown in FIGS. 10 to 12 as those attached in FIGS. 1 to 9.

This valve timing control device is applied to the exhaust valve side of the internal combustion engine so that the phase-varying mechanism 3 (see FIG. 1) is structured to convert the relative rotation phase between the timing sprocket 1 and a camshaft 2 on the exhaust side. As shown in FIG. 10, the lock mechanism 4 is structured to lock the phase-varying mechanism 3 in a most advanced phase position.

As shown in FIG. 10, when the vane rotor 7 rotates relatively to the advance side, one side face of the vane 14a abuts on the side face of the shoe 8a facing the vane 14a, thereby restricting rotation of the vane rotor 7 at the most advanced position. On the other hand, as shown by broken lines in FIG. 10, when the vane rotor 7 rotates relatively to the retard side, the other end face of the vane 14a abuts on the opposite side face of the other shoe 8b facing the vane 14a, thereby restricting rotation of the vane rotor 7 at the most retarded position.

As shown in FIGS. 11 and 12, in the valve body 13, each advance port 35 as the second port is formed in a portion of the shank part 13c adjacent to the flange part 13e, and each retard port 34 as the first port is formed in a portion of the shank part 13c closer to the second side in the longitudinal direction than the advance port 35.

In the valve body 13 configured in this way, the spool valve 31 is arranged opposite in orientation to the spool valve 31 in the control valve 27 applied to the intake valve side. Namely, as shown in FIGS. 11 and 12, the spool valve 31 is arranged to have the first land part 31a located closer to the second side in the longitudinal direction, and have the first spool oil passage 52 closer to the second in the longitudinal direction than the second spool oil passage 54.

Moreover, the spacer 55 is arranged between the first end face of the third land part 31c of the spool valve 31 closer to the first side in the longitudinal direction and the open end face of the larger diameter tubular portion 56b of the cylindrical member 56.

Furthermore, the internal space of the cylindrical member 56 serves as the drain passage 66 for discharging the working oil flowing out from the second sleeve oil passage 39 to the outside via each drain hole 56e of the smaller diameter tubular portion 56c.

As shown in FIG. 12, the control valve 27 having the spool valve 31 and the spacer 55 described above is in a second state where as the spool valve 31 has moved toward the first side in the longitudinal direction, the retard port 34 communicates with the advance port 35 via the first spool oil passage 52, the first sleeve oil passage 38, and the second spool oil passage 54. Namely, the control valve 27 is in a quick response mode where the control valve 27 can quickly raise the internal pressure of each advance hydraulic chamber 10 via each retard port 34 and each advance port 35, and quickly cause the vane rotor 7 to rotate relatively to the most advanced side.

Figure 13:
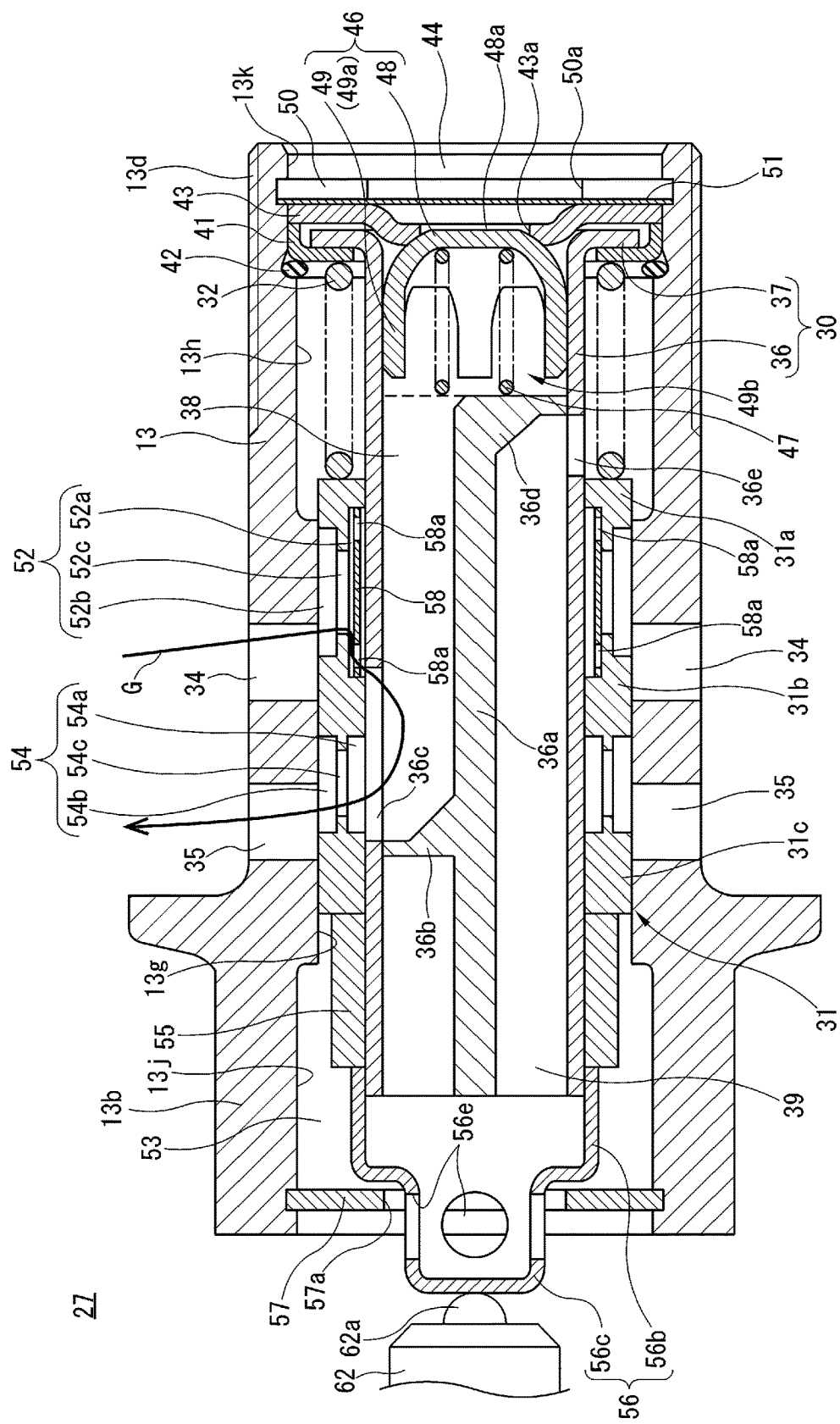
FIG. 13 is a longitudinal sectional view of a spool valve of the control valve according to the present embodiment when the spool valve is in its fifth position.
Figure 14:
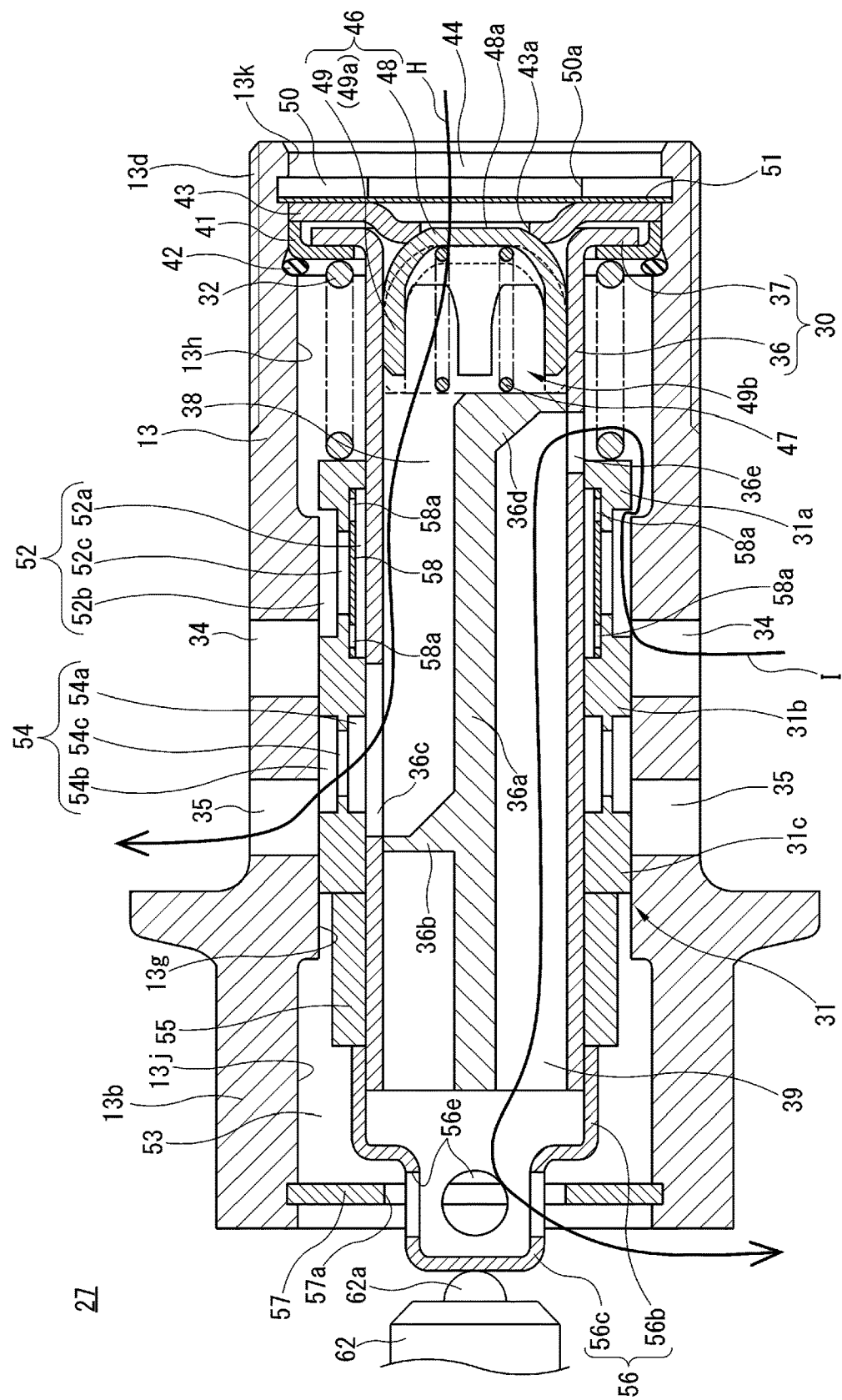
FIG. 14 is a longitudinal sectional view of the spool valve of the control valve according to the present embodiment when the spool valve is in its sixth position.
Figure 15:
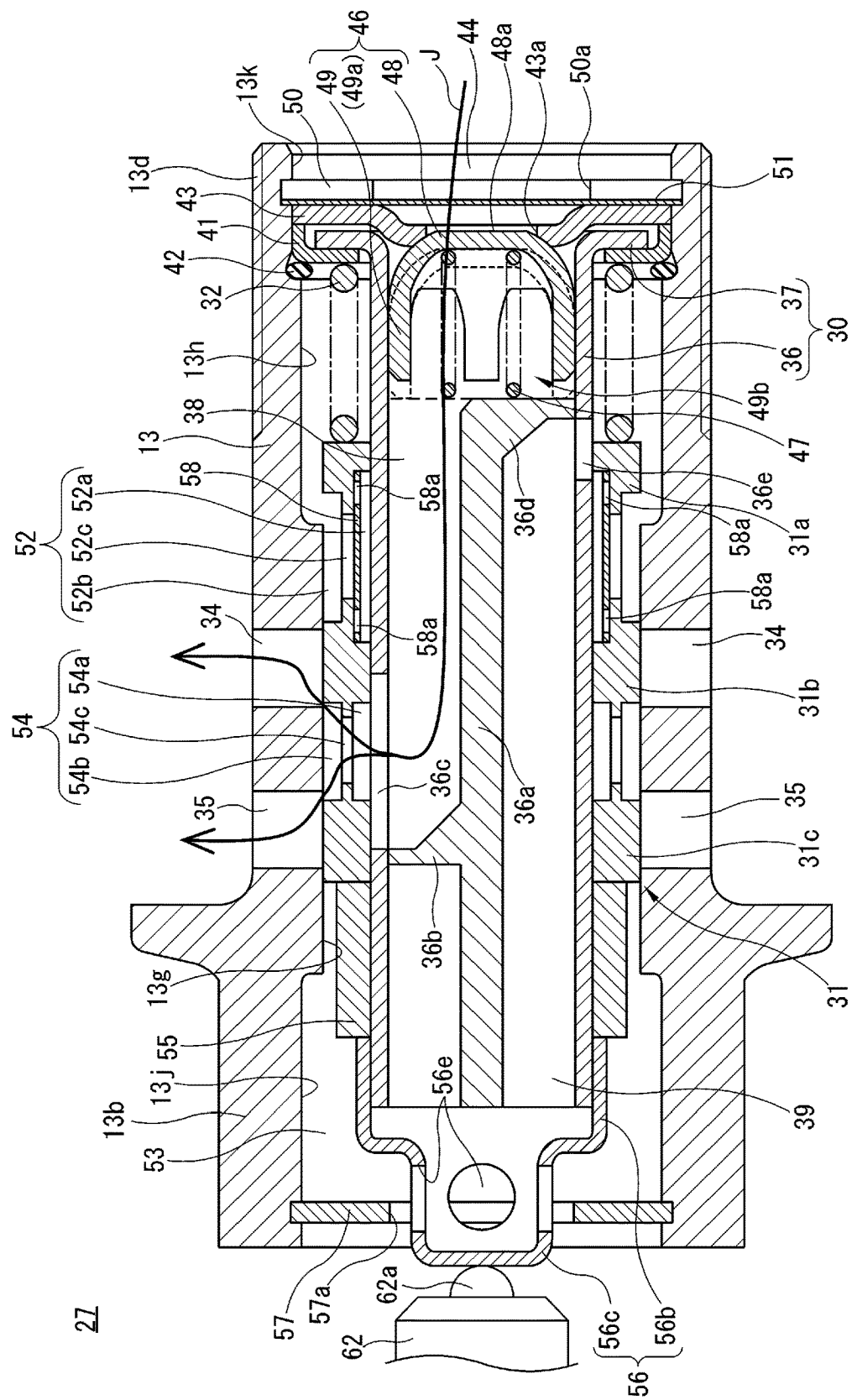
FIG. 15 is a longitudinal sectional view of the spool valve of the control valve according to the present embodiment when the spool valve is in its seventh position.
Figure 16:
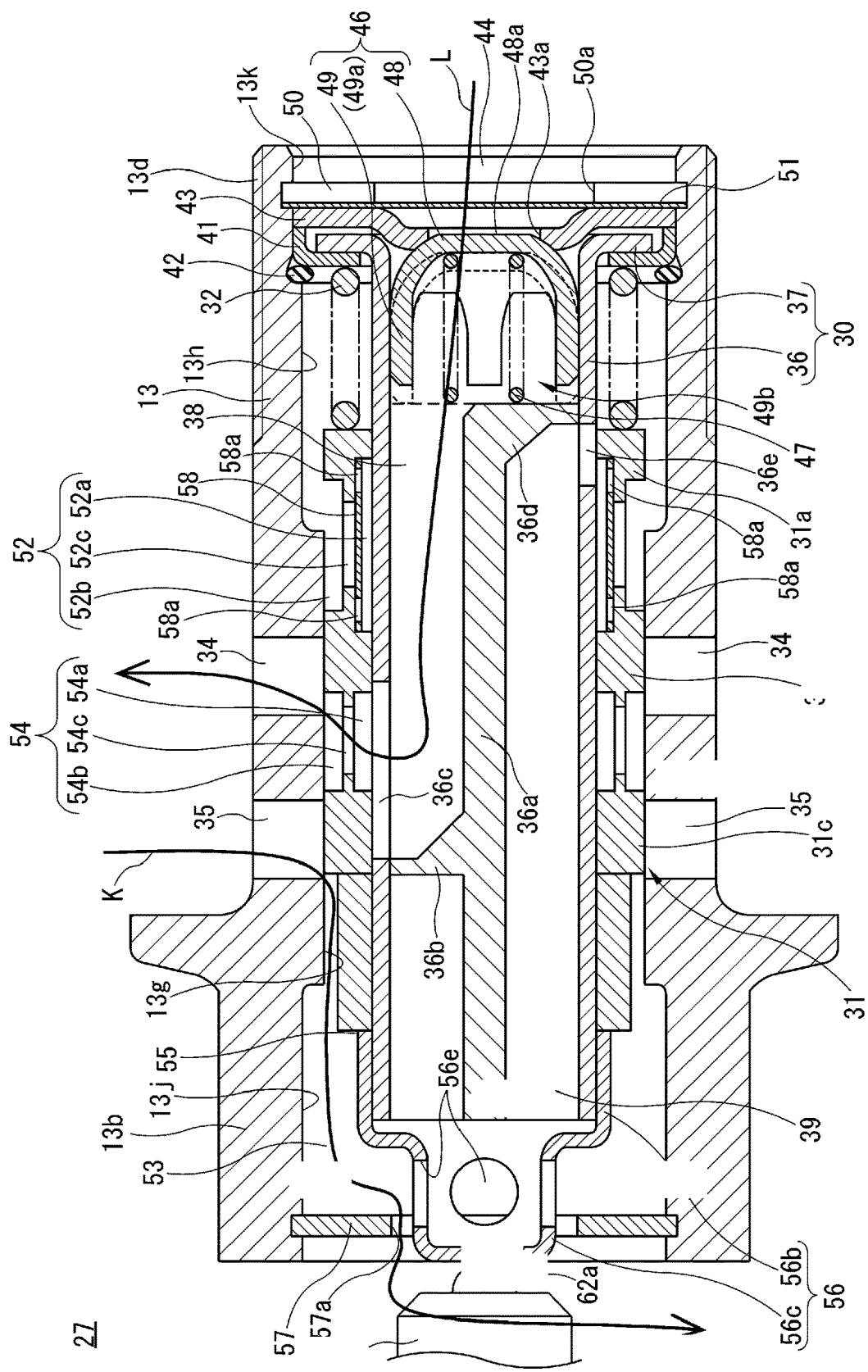
FIG. 16 is a longitudinal sectional view of the spool valve of the control valve according to the present embodiment when the spool valve is in its eighth position.

<Operation of Valve Timing Control Device of Present Embodiment Applied to Exhaust Valve Side> FIG. 13 is a longitudinal sectional view of the spool valve 31 of the hydraulic control valve 27 according to the present embodiment when the spool valve 31 is in its fifth position. FIG. 14 is a longitudinal sectional view of the spool valve 31 of the hydraulic control valve 27 according to the present embodiment when the spool valve is in its sixth position. FIG. 15 is a longitudinal sectional view of the spool valve 31 of the hydraulic control valve 27 according to the present embodiment when the spool valve is in its seventh position. FIG. 16 is a longitudinal sectional view of the spool valve 31 of the hydraulic control valve 27 according to the present embodiment when the spool valve is in its eighth position.

For example, when the accelerator pedal is rapidly depressed for rapid acceleration of the vehicle, the control unit 63 cuts off the electricity to the solenoid 60. In this situation, as shown in FIG. 13, the spool valve 31 is in a position closest to the first side in the longitudinal direction by being biased by the biasing force of the helical compression spring 32 (fifth position).

In this state, the retard port 34 communicates with the first communication hole 52c via the first outer annular groove 52b. Simultaneously, the first sleeve oil passage 38 communicates with the first inner annular groove 52a via the first opening hole 36c. Furthermore, the advance port 35 communicates with the first sleeve oil passage 38 via the second outer annular groove 54b, the second communication hole 54c, the second inner annular groove 54a, and the first opening hole 36c.

The hydraulic pressure in each retard hydraulic chamber 9 acts on the outer peripheral face of the second check valve 58 via each retard port 34, the first outer annular groove 52b, and the first communication hole 52c. When the internal pressure of each retard hydraulic chamber 9 is increased by the alternating torque of the camshaft 2, the second check valve 58, which has been in pressing contact with the bottom face of the first inner annular groove 52a, is reduced in diameter by the hydraulic pressure, so that the first communication hole 52c and the first inner annular groove 52a communicate with each other through the communication holes 58a of the second check valve 58. As a result, the hydraulic pressure in each retarded hydraulic chamber 9 flows through the first outer annular groove 52b, the first communication hole 52c, the communication holes 58a, the first inner annular groove 52a, and the first opening 36c into the first sleeve oil passage 38, as shown by an arrow G in FIG. 13. Then, from the first sleeve oil passage 38, the hydraulic pressure is promptly supplied to each advance hydraulic chamber 10 via the first opening hole 36c, the second inner annular groove 54a, the second communication hole 54c, and the second outer annular groove 54b. Therefore, the internal pressure of each advance hydraulic chamber 10 can be quickly increased, and the vane rotor 7 can be quickly relatively rotated toward the most advanced side (quick response mode).

When the engine is in the high speed and high load region, the control unit 63 supplies a predetermined amount of electricity to the solenoid 60. Accordingly, as shown in FIG. 14, the spool valve 31 is moved toward the second side in the longitudinal direction by the pressing force of the movable core 61 and the pushing part 62a against the biasing force of the helical compression spring 32 (sixth position). As a result, the advance port 35 keeps communicating with the first sleeve oil passage 38 via the second outer annular groove 54b, the second communication hole 54c, the second inner annular groove 54a, and the first opening hole 36c, and the second land part 31b blocks the communication between the first opening hole 36c and the first inner annular groove 52a. Simultaneously, each retard port 34 communicates via the first outer annular groove 52b with the gap between the first land part 31a and the first non-sliding portion 13h and between the sleeve body 36 and the first non-sliding portion 13h. This gap communicates with the second opening hole 36e via the gap in the spiral portion of the helical compression spring 32.

By driving the oil pump 26, the hydraulic pressure, which is discharged to the discharge passage 26a, passes through the supply passage 44, the communication hole 50a of the first stopper member 50, and the filter part 51b (see FIG. 11) of the filter 51, and acts on the first planar portion 48a of the valve part 48 of the valve member 46. As a result, as shown by broken lines in FIG. 14, the valve member 46 moves toward the first side in the longitudinal direction of the valve body 13 against the biasing force of the check spring 47, and comes into contact with the longitudinal end face of the second end wall 36d. With the movement of the valve member 46, the valve part 48 is detached from the valve seat 43, and the hydraulic pressure flows into the first sleeve oil passage 38 via the gap between the valve part 48 and the valve seat 43 and via each slit-shaped gap 49b between the guide pieces 49a, 49a, as shown by an arrow H in FIG. 14. Then, from the first sleeve oil passage 38, as shown by the arrow H in FIG. 14, the hydraulic pressure is supplied to the advance hydraulic chambers 10 via the first opening hole 36c, the second inner annular groove 54a, the second communication hole 54c, the second outer annular groove 54b, and the advance port 35. Therefore, the pressure inside each advance hydraulic chamber 10 becomes high.

Furthermore, as shown by an arrow I in FIG. 14, the hydraulic pressure in each retard hydraulic chamber 9 flows into the second sleeve oil passage 39 via the retard port 34, the first outer annular groove 52b, and the gap between the first land part 31a and the non-sliding portion 13h and between the sleeve body 36 and the non-sliding portion 13h, and the second opening hole 36e. Then, from the second sleeve oil passage 39, the hydraulic pressure is drained to the outside of the valve body 13 via the drain passage 66 of the cylindrical member 56 and the drain holes 56e, as shown by the arrow I in FIG. 14.

Furthermore, when the engine is in steady operation, the control unit 63 supplies a larger amount of electricity to the solenoid 60 than that in the high speed and high load region described above. Accordingly, as shown in FIG. 15, the spool valve 31 is further moved toward the second side in the longitudinal direction by the pressing force of the movable core 61 and the pushing part 62a against the biasing force of the helical compression spring 32 (seventh position). As a result, both of the retard port 34 and the advance port 35 communicate with the first sleeve oil passage 38 via the second outer annular groove 54b, the second communication hole 54c, the second inner annular groove 54a, and the first opening hole 36c.

Then, as shown by an arrow J in FIG. 15, the hydraulic pressure, which has flowed into the first sleeve oil passage 38 via the gap between the valve part 48 and the valve seat 43, flows through the first opening hole 36c, the second inner annular groove 54a, the second communication hole 54c, and the second outer annular groove 54b into the retard port 34 and the advance port 35, and is supplied to the retard hydraulic chambers 9 and the advance hydraulic chambers 10. Therefore, each retard hydraulic chamber 9 and each advance hydraulic chamber 10 become highly pressurized, thereby holding the vane rotor 7.

Furthermore, when the engine is stopped from the steady operation by turning off the ignition switch, the control unit 63 increases the amount of electricity (duty ratio) to the solenoid 60 to near the maximum. Accordingly, as shown in FIG. 16, the spool valve 31 is moved maximally to a position closest to the second side in the longitudinal direction by the pressing force of the movable core 61 and the pushing part 62a against the biasing force of the helical compression spring 32 (eighth position). As a result, the third land part 31c blocks the communication between the advance port 35 and the first opening hole 36c, and the advance port 35_communicates with the drain passage 53 via the gap between the spacer 55 and the slide portion 13g of the valve body 13. Simultaneously, the retard port 34 communicates with the first sleeve oil passage 38 via the second outer annular groove 54b, the second communication hole 54c, the second inner annular groove 54a, and the first opening hole 36c.

As shown by an arrow K in FIG. 16, the hydraulic pressure in each advance hydraulic chamber 10 flows into the drain passage 53 via each advance port 35, the gap between the spacer 55 and the slide portion 13g of the valve body 13. Then, from the drain passage 53, as shown by the arrow K in FIG. 16, the hydraulic pressure is drained to the outside of the valve body 13 via the gap between the communication hole 57a of the second stopper member 57 and the smaller diameter tubular portion 56c. Therefore, the pressure inside each advance hydraulic chamber 10 becomes low.

Next, when the ignition switch is turned on to start the engine, the oil pump 26 is also driven accordingly to discharge the hydraulic pressure to the discharge passage 26a which flows through the supply passage 44, and the communication hole 50a of the first stopper member 50, the filter part 51b (see FIG. 11) of the filter 51, and acts on the first planar portion 48a of the valve part 48 of the valve member 46. As a result, as shown by broken lines in FIG. 16, the valve member 46 moves toward the first side in the longitudinal direction of the valve body 13 against the biasing force of the check spring 47, and comes into contact with the longitudinal end face of the second end wall 36d. With the movement of the valve member 46, the valve part 48 is detached from the valve seat 43, and the hydraulic pressure flows into the first sleeve oil passage 38 via the gap between the valve part 48 and the valve seat 43 and via each slit-shaped gap 49b between the guide pieces 49a, 49a, as shown by the arrow L in FIG. 16. Then, from the first sleeve oil passage 38, as shown by the arrow L in FIG. 16, the hydraulic pressure is supplied to each retard hydraulic chamber 9 via the first opening hole 36c, the second inner annular groove 54a, the second communication hole 54c, the second outer annular groove 54b, and the retard port 34. Therefore, the pressure inside each retardation hydraulic chamber 9 becomes high.

<Behavior and Effects of Present Embodiments> In the present embodiments, the functions of the two control valves 27 implementing different switching timings of the valve timing control device are achieved by changing the orientation of the spool valve 31. Namely, conversion between the first state and the second state can be implemented (the first state and the second state can be assembled) by changing the orientation of the spool valve 31, wherein when in the first state, the second spool oil passage 54 is arranged closer to the second side in the longitudinal direction than the first spool oil passage 52, and wherein when in the second state, the first spool oil passage 52 is arranged closer to the second side in the longitudinal direction than the second spool oil passage 54. In other words, conversion between a first quick response mode and a second quick response mode can be implemented without addition of new components, wherein when in the first quick response mode, with the spool valve 31 moved to the second side in the longitudinal direction, the retard port 34 communicates with the advance port 35 via the first spool oil passage 52, the second check valve 58, and the second spool oil passage 54, and wherein when in the second quick response mode, with the spool valve 31 moved to the first side in the longitudinal direction, the retard port 34 communicates with the advance port 35 via the first spool oil passage 52, the second check valve 58, and the second spool oil passage 54. Therefore, the components of the two types of control valves 27 can be shared, and the manufacturing cost of the control valve 27 can be reduced.

Furthermore, in the present embodiments, when in the first state, the spacer 55 is arranged closer to the second side in the longitudinal direction than the spool valve 31, and when in the second state, the spacer 55 is arranged closer to the first side in the longitudinal direction than the spool valve 31.

Therefore, when in the first state, the positions of the first and second spool oil passages 52 and 54 can be appropriately adjusted in the configuration that the helical compression spring 32 is arranged between the spacer 55 and the spool valve 31. Furthermore, when in the second state, the positions of the first and second spool oil passages 52 and 54 can be appropriately adjusted in the configuration that the spacer 55 is arranged between the spool valve 31 and the cylindrical member 56.

Furthermore, in the present embodiments, the spool valve 31 has a tubular shape and is arranged between the sleeve 30 and the valve body 13, and the first spool oil passage 52 is a first through hole extending through between the inner peripheral face and the outer peripheral face of the spool valve 31.

The feature that the spool valve 31 is thus cylindrically shaped, allows the spool valve 31 to be easily inserted into the space formed between the sleeve 30 and the valve body 13 that extends continuously in the circumferential direction, and thereby enhances the ease of assembling of the control valve 27.

Furthermore, in the present embodiments, the valve body 13 includes in its inner peripheral face the slide portion 13*g* on which the spool valve 31 slides, and the first non-slide portion 13*h* arranged closer to the second side in the longitudinal direction than the slide portion 13*g*, and the second non-slide portion 13*j* arranged closer to the first side in the longitudinal direction than the slide portion 13*g*.

Accordingly, as the spool valve 31 moves in the longitudinal direction, the space between the first non-sliding portion 13*h* and the spool valve 31 and the space between the second non-sliding portion 13*j* and the spool valve 31 can be used as oil passages through which working oil flows.

Furthermore, in the present embodiments, the biasing member is the helical compression spring 32, and when in the first state, the helical compression spring 32 is arranged between the spool valve 31 and the spacer 55.

Therefore, as well as the gap formed between the spool valve 31 and the spacer 55, the gap in the spirally continuous portion of the helical compression spring 32 can be used as an oil passage through which the working oil flows.

Furthermore, in the present embodiments, the sleeve 30 has the second sleeve oil passage 39 communicating with the drain space of the internal combustion engine, and when in the first state, the second sleeve oil passage 39 is open between the spool valve 31 and the spacer 55.

The thus configured second sleeve oil passage 39 can be used as a drain oil passage for draining the working oil.

Furthermore, in the present embodiments, the outer diameter of the spacer 55 is set smaller than the outer diameter of the spool valve 31, thereby forming an oil passage between the outer peripheral face of the spacer 55 and the inner peripheral face of the valve body 13.

Therefore, when the control valve 27 is in the second state, the working oil can be drained via the formed oil passage and the drain passage 53 communicating with this oil passage.

In the embodiments described above, the spool valve 31 is arranged outside the outer periphery of the sleeve 30, but the present invention may be implemented by a configuration in which a sleeve is arranged outside an outer periphery of a spool valve.

The control valve for the internal combustion engine valve timing control device according to the embodiments described above may be embodied as follows.

According to an embodiment, a control valve for an internal combustion engine valve timing control device structured to vary a relative rotational phase of a camshaft with respect to a crankshaft by supply and drainage of working oil to and from a first hydraulic chamber and a second hydraulic chamber, the control valve comprising: a valve body being tubular and including a first port and a second port, wherein the first port communicates with the first hydraulic chamber, and wherein the second port communicates with the second hydraulic chamber; a sleeve disposed inside the valve body and defining a first sleeve oil passage inside the sleeve; a spool valve disposed inside the valve body, structured to travel in a longitudinal direction of the valve body, and including a first spool oil passage and a second spool oil passage; a check valve mounted to the spool valve and structured to allow a flow of working oil from a first end of the first spool oil passage to a second end of the first spool oil passage and restrict a flow of working oil from the second end to the first end; and a biasing member disposed inside the valve body and structured to bias the spool valve toward a first side in the longitudinal direction; wherein the spool valve is structured to be assembled in a first state and in a second state; when in the first state: the spool valve is disposed such that the second spool oil passage is closer to a second side opposite to the first side in the longitudinal direction than the first spool oil passage; and as the spool valve has traveled toward the second side in the longitudinal direction against a biasing force of the biasing member, the first port communicates with the second port via the first spool oil passage, the first sleeve oil passage, and the second spool oil passage; and when in the second state: the spool valve is disposed such that the first spool oil passage is closer to the second side in the longitudinal direction than the second spool oil passage; and as the spool valve has traveled toward the first side in the longitudinal direction, the first port communicates with the second port via the first spool oil passage, the first sleeve oil passage, and the second spool oil passage.

According to a preferable embodiment, the control valve includes a spacer arranged with the spool valve in the longitudinal direction, wherein: when in the first state, the spacer is disposed closer to the second side in the longitudinal direction than the spool valve; and when in the second state, the spacer is disposed closer to the first side in the longitudinal direction than the spool valve.

According to another preferable embodiment, the control valve according to any one of the foregoing embodiments is configured such that: the spool valve is tubular and disposed between the sleeve and the valve body; and the first spool oil passage is a first through hole extending between an inner peripheral face of the spool valve and an outer peripheral face of the spool valve.

According to another preferable embodiment, the control valve according to any one of the foregoing embodiments is configured such that: the spool valve includes: a first inner annular groove formed in the inner peripheral face of the spool valve; and a first outer annular groove formed in the outer peripheral face of the spool valve; the first through hole communicates with the first inner annular groove and the first outer annular groove; and the check valve is disposed in the first inner annular groove.

According to another preferable embodiment, the control valve according to any one of the foregoing embodiments is configured such that the valve body includes at the inner peripheral face of the valve body: a slide portion on which the spool valve slides; a first non-slide portion disposed closer to the second side in the longitudinal direction and being larger in inner diameter than the slide portion; and a second non-slide portion disposed closer to the first side in the longitudinal direction and being larger in inner diameter than the slide portion.

According to another preferable embodiment, the control valve according to any one of the foregoing embodiments is configured such that: the biasing member is a helical compression spring; and when in the first state, the biasing member is disposed between the spool valve and the spacer.

According to another preferable embodiment, the control valve according to any one of the foregoing embodiments is configured such that: the sleeve includes a second sleeve oil passage communicating with a drain space of an internal combustion engine; and when in the first state, the second sleeve oil passage is open between the spool valve and the spacer.

According to another preferable embodiment, the control valve according to any one of the foregoing embodiments is configured such that the first port is structured to be set in a state communicating with the second non-slide portion via a first outer annular groove formed in an outer peripheral face of the spool valve, when in the first state.

According to another preferable embodiment, the control valve according to any one of the foregoing embodiments is configured such that the second port is structured to be set in a state communicating with the first non-slide portion via the first outer annular groove, when in the second state.

According to another preferable embodiment, the control valve according to any one of the foregoing embodiments includes: a cylindrical member slidably mounted to a first end part of the sleeve in the longitudinal direction, having an inner diameter larger than an outer diameter of the sleeve, and having an outer diameter smaller than an inner diameter of the valve body; and an actuator structured to cause the spool valve via the cylindrical member to move toward the second side in the longitudinal direction against the biasing force of the biasing member.

According to another preferable embodiment, the control valve according to any one of the foregoing embodiments is configured such that the spacer is smaller in outer diameter than the spool valve such that an oil passage is formed between an outer peripheral face of the spacer and an inner peripheral face of the valve body.

Furthermore, the valve timing control system according to the embodiments described above may be embodied as follows.

A valve timing control system includes: a housing to which a torque is transmitted from a crankshaft; a vane rotor disposed inside the housing and including a vane dividing an internal space of the housing into a first hydraulic chamber and a second hydraulic chamber; a valve body being tubular, fixing the vane rotor to a camshaft, and including a first port, a second port, a supply passage, and a drain passage, wherein the first port communicates with the first hydraulic chamber, wherein the second port communicates with the second hydraulic chamber, wherein the supply passage is structured to communicate with an external oil supply part, and wherein the drain passage is structured to communicate with an external drain space; a sleeve disposed inside the valve body and defining a first sleeve oil passage inside the sleeve, wherein the first sleeve oil passage is structured to communicate with the external oil supply part; a spool valve being tubular, disposed between the valve body and the sleeve, structured to travel in a longitudinal direction of the valve body, and including a first spool oil passage and a second spool oil passage, wherein the first spool oil passage and the second spool oil passage each extend radially through the spool valve; a check valve mounted to the spool valve and structured to allow a flow of working oil from a first end of the first spool oil passage to a second end of the first spool oil passage and restrict a flow of working oil from the second end to the first end; and a biasing member disposed inside the valve body and structured to bias the spool valve toward a first side in the longitudinal direction; wherein the spool valve is structured to be assembled in a first state and in a second state; when in the first state: the spool valve is disposed such that the second spool oil passage is closer to a second side opposite to the first side in the longitudinal direction than the first spool oil passage; and as the spool valve has traveled toward the second side in the longitudinal direction against a biasing force of the biasing member, the first port communicates with the second port via the first spool oil passage, the first sleeve oil passage, and the second spool oil passage; and when in the second state: the spool valve is disposed such that the first spool oil passage is closer to the second side in the longitudinal direction than the second spool oil passage; and as the spool valve has traveled toward the first side in the longitudinal direction, the first port communicates with the second port via the first spool oil passage, the first sleeve oil passage, and the second spool oil passage.

According to a preferable embodiment, the control valve is configured such that: the first state is a state allowing the camshaft to be rotated with respect to the housing for opening and closing an intake valve; and the second state is a state allowing the camshaft to be rotated with respect to the housing for opening and closing an exhaust valve.

According to another preferable embodiment, the control valve according to any one of the foregoing embodiments is configured such that: the first spool oil passage includes: a first inner annular groove formed in an inner peripheral face of the spool valve; and a first outer annular groove formed in an outer peripheral face of the spool valve; a first position is defined as a position when in the first state where the first port communicates with the second port via the first spool oil passage, the first sleeve oil passage, and the second spool oil passage; and when in a second position where the spool valve has traveled from the first position to be closer to the first side in the longitudinal direction than when in the first position, the first port communicates with the drain passage via the first outer annular groove, and the second port communicates with the first sleeve oil passage via the second spool oil passage.

According to another preferable embodiment, the control valve according to any one of the foregoing embodiments is configured such that when in a third position where the spool valve has traveled from the second position to be closer to the first side in the longitudinal direction than when in the second position, the first port and the second port communicate with the first sleeve oil passage via the second spool oil passage.

According to another preferable embodiment, the control valve of the valve timing control system according to any one of the foregoing embodiments includes a spacer arranged with the spool valve and the biasing member in the longitudinal direction, wherein: the sleeve defines a second sleeve oil passage inside the sleeve, wherein the second sleeve oil passage communicates with the drain passage; and when in a fourth position where the spool valve has traveled from the third position to be closer to the first side in the longitudinal direction than when in the third position, the first port communicates with the first sleeve oil passage via the second spool oil passage, and the second port communicates with the second sleeve oil passage via a space between an outer peripheral face of the sleeve and an inner peripheral face of the valve body.

According to another preferable embodiment, the control valve according to any one of the foregoing embodiments is configured such that: the first spool oil passage includes: a first inner annular groove formed in an inner peripheral face of the spool valve; and a first outer annular groove formed in an outer peripheral face of the spool valve; the sleeve defines a second sleeve oil passage inside the sleeve, wherein the second sleeve oil passage communicates with the drain passage; a fifth position is defined as a position when in the second state where the first port communicates with the second port via the first spool oil passage, the first sleeve oil passage, and the second spool oil passage; and when in a sixth position where the spool valve has traveled from the fifth position to be closer to the second side in the longitudinal direction than when in the fifth position, the first port communicates with the first sleeve oil passage via the second spool oil passage, and the second port communicates with the second sleeve oil passage via the first outer annular groove and a space between an outer peripheral face of the sleeve and an inner peripheral face of the valve body.

According to another preferable embodiment, the control valve according to any one of the foregoing embodiments is configured such that when in a seventh position where the spool valve has traveled from the sixth position to be closer to the second side in the longitudinal direction than when in the sixth position, the first port and the second port communicate with the first sleeve oil passage via the second spool oil passage.

According to another preferable embodiment, the control valve of the valve timing control system according to any one of the foregoing embodiments includes a spacer disposed closer to the first side in the longitudinal direction than the spool valve, wherein when in an eighth position where the spool valve has traveled from the seventh position to be closer to the second side in the longitudinal direction than when in the seventh position, the first port communicates with the drain passage via a space between an outer peripheral face of the spacer and an inner peripheral face of the valve body, and the second port communicates with the first sleeve oil passage via the second spool oil passage.

The invention claimed is:

1. A control valve for an internal combustion engine valve timing control device structured to vary a relative rotational phase of a camshaft with respect to a crankshaft by supply and drainage of working oil to and from a first hydraulic chamber and a second hydraulic chamber, the control valve comprising:
  a valve body being tubular and including a first port and a second port, wherein the first port communicates with the first hydraulic chamber, and wherein the second port communicates with the second hydraulic chamber;
  a sleeve disposed inside the valve body and defining a first sleeve oil passage inside the sleeve;
  a spool valve disposed inside the valve body, structured to travel in a longitudinal direction of the valve body, and including a first spool oil passage and a second spool oil passage;
  a check valve mounted to the spool valve and structured to allow a flow of working oil from a first end of the first spool oil passage to a second end of the first spool oil passage and restrict a flow of working oil from the second end to the first end; and
  a biasing member disposed inside the valve body and structured to bias the spool valve toward a first side in the longitudinal direction; wherein
  the spool valve is structured to be assembled in a first state and in a second state;
  when in the first state:
    the spool valve is disposed such that the second spool oil passage is closer to a second side opposite to the first side in the longitudinal direction than the first spool oil passage; and
    as the spool valve has traveled toward the second side in the longitudinal direction against a biasing force of the biasing member, the first port communicates with the second port via the first spool oil passage, the first sleeve oil passage, and the second spool oil passage; and
  when in the second state:
    the spool valve is disposed such that the first spool oil passage is closer to the second side in the longitudinal direction than the second spool oil passage; and
    as the spool valve has traveled toward the first side in the longitudinal direction, the first port communicates with the second port via the first spool oil passage, the first sleeve oil passage, and the second spool oil passage.

2. The control valve for the internal combustion engine valve timing control device as claimed in claim 1, comprising a spacer arranged with the spool valve in the longitudinal direction, wherein:
  when in the first state, the spacer is disposed closer to the second side in the longitudinal direction than the spool valve; and
  when in the second state, the spacer is disposed closer to the first side in the longitudinal direction than the spool valve.

3. The control valve for the internal combustion engine valve timing control device as claimed in claim 2, wherein:
  the spool valve is tubular and disposed between the sleeve and the valve body; and
  the first spool oil passage is a first through hole extending between an inner peripheral face of the spool valve and an outer peripheral face of the spool valve.

4. The control valve for the internal combustion engine valve timing control device as claimed in claim 3, wherein:
  the spool valve includes:
    a first inner annular groove formed in the inner peripheral face of the spool valve; and
    a first outer annular groove formed in the outer peripheral face of the spool valve;
  the first through hole communicates with the first inner annular groove and the first outer annular groove; and
  the check valve is disposed in the first inner annular groove.

5. The control valve for the internal combustion engine valve timing control device as claimed in claim 4, wherein the valve body includes at the inner peripheral face of the valve body:
  a slide portion on which the spool valve slides;
  a first non-slide portion disposed closer to the second side in the longitudinal direction and being larger in inner diameter than the slide portion; and
  a second non-slide portion disposed closer to the first side in the longitudinal direction and being larger in inner diameter than the slide portion.

6. The control valve for the internal combustion engine valve timing control device as claimed in claim 2, wherein:
  the biasing member is a helical compression spring; and
  when in the first state, the biasing member is disposed between the spool valve and the spacer.

7. The control valve for the internal combustion engine valve timing control device as claimed in claim 6, wherein:
  the sleeve includes a second sleeve oil passage communicating with a drain space of an internal combustion engine; and
  when in the first state, the second sleeve oil passage is open between the spool valve and the spacer.

8. The control valve for the internal combustion engine valve timing control device as claimed in claim 7, wherein:
  the valve body includes at the inner peripheral face of the valve body:
    a slide portion on which the spool valve slides;

a first non-slide portion disposed closer to the second side in the longitudinal direction and being larger in inner diameter than the slide portion; and a second non-slide portion disposed closer to the first side in the longitudinal direction and being larger in inner diameter than the slide portion; and the first port is structured to be set in a state communicating with the second non-slide portion via a first outer annular groove formed in an outer peripheral face of the spool valve, when in the first state.

9. The control valve for the internal combustion engine valve timing control device as claimed in claim 7, wherein:

the spool valve is tubular and disposed between the sleeve and the valve body;

the spool valve includes a first outer annular groove formed in an outer peripheral face of the spool valve;

the valve body includes at the inner peripheral face of the valve body:
 a slide portion on which the spool valve slides;
 a first non-slide portion disposed closer to the second side in the longitudinal direction and being larger in inner diameter than the slide portion; and
 a second non-slide portion disposed closer to the first side in the longitudinal direction and being larger in inner diameter than the slide portion; and the first port is structured to be set in a state communicating with the first non-slide portion via the first outer annular groove, when in the second state.

10. The control valve for the internal combustion engine valve timing control device as claimed in claim 3, comprising:

a cylindrical member slidably mounted to a first end part of the sleeve in the longitudinal direction, having an inner diameter larger than an outer diameter of the sleeve, and having an outer diameter smaller than an inner diameter of the valve body; and an actuator structured to cause the spool valve via the cylindrical member to move toward the second side in the longitudinal direction against the biasing force of the biasing member.

11. The control valve for the internal combustion engine valve timing control device as claimed in claim 3, wherein the spacer is smaller in outer diameter than the spool valve such that an oil passage is formed between an outer peripheral face of the spacer and an inner peripheral face of the valve body.

12. An internal combustion engine valve timing control system comprising:

a housing to which a torque is transmitted from a crankshaft;

a vane rotor disposed inside the housing and including a vane dividing an internal space of the housing into a first hydraulic chamber and a second hydraulic chamber;

a valve body being tubular, fixing the vane rotor to a camshaft, and including a first port, a second port, a supply passage, and a drain passage, wherein the first port communicates with the first hydraulic chamber, wherein the second port communicates with the second hydraulic chamber, wherein the supply passage is structured to communicate with an external oil supply part, and wherein the drain passage is structured to communicate with an external drain space;

a sleeve disposed inside the valve body and defining a first sleeve oil passage inside the sleeve, wherein the first sleeve oil passage is structured to communicate with the external oil supply part;

a spool valve being tubular, disposed between the valve body and the sleeve, structured to travel in a longitudinal direction of the valve body, and including a first spool oil passage and a second spool oil passage, wherein the first spool oil passage and the second spool oil passage each extend radially through the spool valve;

a check valve mounted to the spool valve and structured to allow a flow of working oil from a first end of the first spool oil passage to a second end of the first spool oil passage and restrict a flow of working oil from the second end to the first end; and a biasing member disposed inside the valve body and structured to bias the spool valve toward a first side in the longitudinal direction; wherein the spool valve is structured to be assembled in a first state and in a second state;

when in the first state:
 the spool valve is disposed such that the second spool oil passage is closer to a second side opposite to the first side in the longitudinal direction than the first spool oil passage; and
 as the spool valve has traveled toward the second side in the longitudinal direction against a biasing force of the biasing member, the first port communicates with the second port via the first spool oil passage, the first sleeve oil passage, and the second spool oil passage; and when in the second state:
 the spool valve is disposed such that the first spool oil passage is closer to the second side in the longitudinal direction than the second spool oil passage; and
 as the spool valve has traveled toward the first side in the longitudinal direction, the first port communicates with the second port via the first spool oil passage, the first sleeve oil passage, and the second spool oil passage.

13. The internal combustion engine valve timing control system as claimed in claim 12, wherein:

the first state is a state allowing the camshaft to be rotated with respect to the housing for opening and closing an intake valve; and the second state is a state allowing the camshaft to be rotated with respect to the housing for opening and closing an exhaust valve.

14. The internal combustion engine valve timing control system as claimed in claim 13, wherein:

the first spool oil passage includes:
 a first inner annular groove formed in an inner peripheral face of the spool valve; and
 a first outer annular groove formed in an outer peripheral face of the spool valve;

a first position is defined as a position when in the first state where the first port communicates with the second port via the first spool oil passage, the first sleeve oil passage, and the second spool oil passage; and when in a second position where the spool valve has traveled from the first position to be closer to the first side in the longitudinal direction than when in the first position, the first port communicates with the drain passage via the first outer annular groove, and the second port communicates with the first sleeve oil passage via the second spool oil passage.

15. The internal combustion engine valve timing control system as claimed in claim 14, wherein when in a third position where the spool valve has traveled from the second position to be closer to the first side in the longitudinal direction than when in the second position, the first port and the second port communicate with the first sleeve oil passage via the second spool oil passage.

16. The internal combustion engine valve timing control system as claimed in claim 15, comprising a spacer arranged with the spool valve and the biasing member in the longitudinal direction, wherein:
- the sleeve defines a second sleeve oil passage inside the sleeve, wherein the second sleeve oil passage communicates with the drain passage; and
- when in a fourth position where the spool valve has traveled from the third position to be closer to the first side in the longitudinal direction than when in the third position, the first port communicates with the first sleeve oil passage via the second spool oil passage, and the second port communicates with the second sleeve oil passage via a space between an outer peripheral face of the sleeve and an inner peripheral face of the valve body.

17. The internal combustion engine valve timing control system as claimed in claim 13, wherein:
- the first spool oil passage includes:
  - a first inner annular groove formed in an inner peripheral face of the spool valve; and
  - a first outer annular groove formed in an outer peripheral face of the spool valve;
- the sleeve defines a second sleeve oil passage inside the sleeve, wherein the second sleeve oil passage communicates with the drain passage;
- a fifth position is defined as a position when in the second state where the first port communicates with the second port via the first spool oil passage, the first sleeve oil passage, and the second spool oil passage; and
- when in a sixth position where the spool valve has traveled from the fifth position to be closer to the second side in the longitudinal direction than when in the fifth position, the second port communicates with the first sleeve oil passage via the second spool oil passage, and the first port communicates with the second sleeve oil passage via the first outer annular groove and a space between an outer peripheral face of the sleeve and an inner peripheral face of the valve body.

18. The internal combustion engine valve timing control system as claimed in claim 17, wherein when in a seventh position where the spool valve has traveled from the sixth position to be closer to the second side in the longitudinal direction than when in the sixth position, the first port and the second port communicate with the first sleeve oil passage via the second spool oil passage.

19. The internal combustion engine valve timing control system as claimed in claim 18, comprising a spacer disposed closer to the first side in the longitudinal direction than the spool valve, wherein when in an eighth position where the spool valve has traveled from the seventh position to be closer to the second side in the longitudinal direction than when in the seventh position, the second port communicates with the drain passage via a space between an outer peripheral face of the spacer and an inner peripheral face of the valve body, and the first port communicates with the first sleeve oil passage via the second spool oil passage.

* * * * *